US012350957B2

(12) United States Patent
Yoshizawa et al.

(10) Patent No.: US 12,350,957 B2
(45) Date of Patent: Jul. 8, 2025

(54) ENVELOPE PROCESSING APPARATUS AND IMAGE FORMING SYSTEM

(71) Applicants: Shingo Yoshizawa, Kanagawa (JP); Michitaka Suzuki, Kanagawa (JP); Nobuyoshi Suzuki, Tokyo (JP); Yuusuke Shibasaki, Tokyo (JP); Takahiro Matsuda, Kanagawa (JP); Atsushi Shinoda, Kanagawa (JP); Takahiro Watanabe, Kanagawa (JP); Takuya Morinaga, Tokyo (JP)

(72) Inventors: Shingo Yoshizawa, Kanagawa (JP); Michitaka Suzuki, Kanagawa (JP); Nobuyoshi Suzuki, Tokyo (JP); Yuusuke Shibasaki, Tokyo (JP); Takahiro Matsuda, Kanagawa (JP); Atsushi Shinoda, Kanagawa (JP); Takahiro Watanabe, Kanagawa (JP); Takuya Morinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 121 days.

(21) Appl. No.: 18/461,031

(22) Filed: Sep. 5, 2023

(65) Prior Publication Data

US 2024/0075767 A1 Mar. 7, 2024

(30) Foreign Application Priority Data

Sep. 6, 2022 (JP) ................................ 2022-141491

(51) Int. Cl.
*B43M 3/04* (2006.01)
*B43M 5/04* (2006.01)
*B65H 43/00* (2006.01)

(52) U.S. Cl.
CPC ............ *B43M 5/042* (2013.01); *B65H 43/00* (2013.01); *B65H 2511/20* (2013.01)

(58) Field of Classification Search
CPC . B43M 3/00; B43M 3/02; B43M 3/04; B43M 3/045; B43M 5/00; B43M 5/04;
(Continued)

(56) References Cited

U.S. PATENT DOCUMENTS 7,104,034 B2 * 9/2006 Stemmle ................ B65H 45/04 53/284.3
10,532,604 B2 * 1/2020 Depoi .................... B43M 3/045
(Continued)

FOREIGN PATENT DOCUMENTS

JP 2011-236015 A 11/2011
JP 2012-056665 A 3/2012
(Continued)

OTHER PUBLICATIONS

U.S. Appl. No. 18/174,919, filed Feb. 27, 2023.
U.S. Appl. No. 18/332,943, filed Jun. 12, 2023.
U.S. Appl. No. 18/337,797, filed Jun. 20, 2023.

*Primary Examiner* — Leslie A Nicholson, III
(74) *Attorney, Agent, or Firm* — Harness, Dickey & Pierce, P.L.C.

(57) ABSTRACT

An envelope processing apparatus conveys an envelope to an enclosing position and encloses an enclosure on which specific information is formed at a formation position. The enclosing device includes: an envelope conveyor to convey the enclosure to the enclosing position to insert the enclosure into the envelope; a sensor to acquire, as an image, a structure of the envelope during conveyance, and acquire transparent-portion information indicating a position of a transparent portion in the envelope; an envelope holder to hold the envelope in a state in which the enclosure is insertable; and control circuitry to output position adjustment information for adjusting a position of the envelope in a width direction of the envelope at the enclosing position or a position of the specific information in a conveyance
(Continued)

direction of the envelope, based on relative positions between the formation position of the specific information and the position of the transparent portion.

9 Claims, 28 Drawing Sheets

(58) Field of Classification Search
CPC ........ B43M 5/042; B65H 43/00; B65H 45/14; B65H 2511/20; B65H 2701/1916; B65H 2801/27; B65H 2801/66
USPC ....................................................... 270/58.06
See application file for complete search history.

(56) References Cited

U.S. PATENT DOCUMENTS

| | | | | |
|---|---|---|---|---|
| 11,970,019 | B2 * | 4/2024 | Suzuki | B41J 3/28 |
| 12,151,505 | B2 * | 11/2024 | Matsuda | B43M 5/042 |
| 2011/0277418 | A1 | 11/2011 | Kunieda et al. | |
| 2012/0131885 | A1 | 5/2012 | Matsushita et al. | |
| 2012/0322641 | A1 | 12/2012 | Matsushita et al. | |
| 2022/0379653 | A1 | 12/2022 | Kunieda et al. | |
| 2022/0380168 | A1 | 12/2022 | Shibasaki et al. | |

FOREIGN PATENT DOCUMENTS

| | | | |
|---|---|---|---|
| JP | 2016-030676 | A | 3/2016 |
| JP | 2018-001572 | A | 1/2018 |
| JP | 2018-058258 | A | 4/2018 |

* cited by examiner

ENVELOPE PROCESSING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-141491, filed on Sep. 6, 2022, in the Japan Patent Office, the entire disclosure of which is hereby incorporated by reference herein.

BACKGROUND

Technical Field

Embodiments of the present disclosure relate to an envelope processing apparatus and an image forming system.

Related Art

An enclosing device is known in the art that encloses an enclosure in an envelope. In addition, an enclosing-and-sealing apparatus is known in the art that also encloses and seals an enclosure in an envelope. An image forming system is also known in which an image forming apparatus that forms an image on a sheet medium as an enclosure, an enclosing device, and an enclosing-and-sealing apparatus are linked together. Further, an image forming system is also known that encloses and seals an enclosure obtained by performing predetermined folding processing on a medium on which an image is formed.

A technology is also known in which, when information indicating a transmission destination (address) of an enclosure is formed and the enclosure is enclosed in an envelope, the enclosure is folded at an appropriate position in order that specific information such as an address can be viewed from a window-shaped portion formed in the envelope.

SUMMARY

According to an embodiment of the present disclosure, an envelope processing apparatus conveys an envelope to an enclosing position and encloses an enclosure on which specific information is formed at a formation position. The enclosing device includes an envelope conveyor, a sensor, an envelope holder, and control circuitry. The envelope conveyor conveys the enclosure to the enclosing position to insert the enclosure into the envelope and ejects the envelope in which the enclosure has been inserted. The sensor acquires, as an image, a structure of the envelope during conveyance of the envelope, and acquires at least transparent-portion information indicating a position of a transparent portion included in the structure of the envelope. The envelope holder holds the envelope, which has reached the enclosing position, in a state in which the enclosure is insertable into the envelope. The control circuitry outputs position adjustment information for adjusting a position of the envelope in a width direction of the envelope at the enclosing position or a position of the specific information in a conveyance direction of the envelope, based on relative positions between the formation position of the specific information and the position of the transparent portion.

According to another embodiment of the present disclosure, an image forming system includes an image forming apparatus and the envelope processing apparatus. The image forming apparatus forms an image on the enclosure. The image forming apparatus includes an operation interface to specify a position of the transparent portion relative to the formation position of the specific information, based on an operation by a user. The control circuitry is configured to output the position adjustment information for adjusting the position of the envelope in the width direction at the enclosing position or the position of the specific information in the conveyance direction of the envelope, based on the position of the transparent portion specified by the operation interface and the relative positions between the formation position of the specific information and the position of the transparent portion.

According to still another embodiment of the present disclosure, an image forming system includes the enclosing device and an image forming apparatus. The image forming apparatus includes a folding processing device to fold the enclosure of a sheet shape and adjust a folding position of the enclosure based on the position adjustment information.

According to still yet another embodiment of the present disclosure, an image forming system includes an image forming apparatus and the envelope processing apparatus. The image forming apparatus forms an image on a sheet medium. The envelope processing apparatus inserts the sheet medium as the enclosure, on which the image has been formed, into the envelope.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
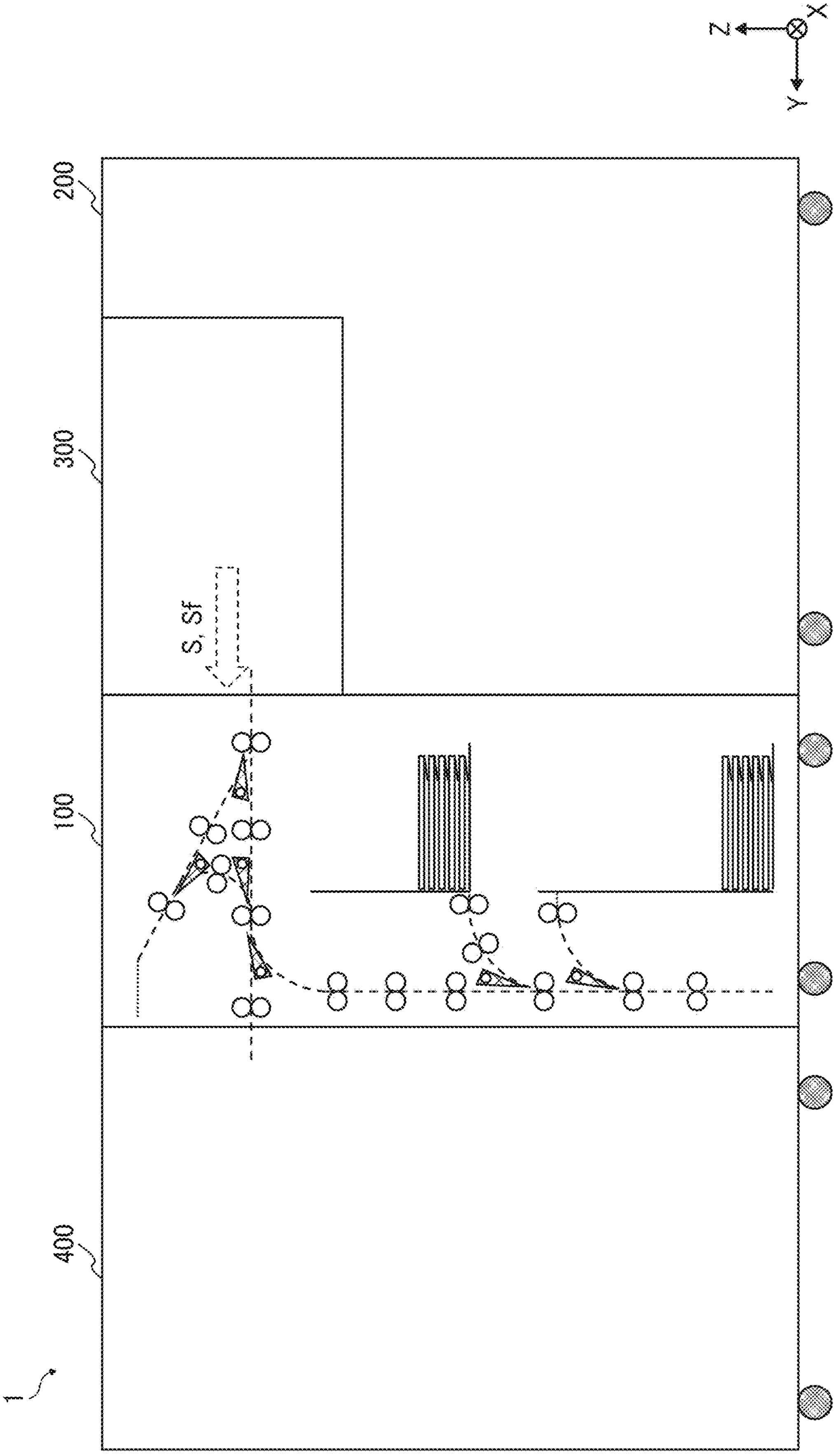
FIG. 1 is a front appearance view of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, an envelope processing apparatus and an image forming system according to embodiments of the present disclosure are described below. FIG. 1 is a front view of an image forming system 1, which serves as an envelope processing apparatus and an image forming system according to embodiments of the present disclosure, illustrating an internal configuration of the image forming system 1. The image forming system 1 serving as an image forming system includes an image forming apparatus 200, a folding apparatus 300 serving as a sheet processing apparatus, an envelope processing apparatus 100 according to an embodiment of the present disclosure that operates in cooperation with the folding apparatus 300, and a post-processing apparatus 400.

The image forming system 1 is a system configured to be able to cooperate by in-line connection of the image forming apparatus 200, the folding apparatus 300, the envelope processing apparatus 100, and the post-processing apparatus 400, and corresponds to an image forming apparatus according to an embodiment of the present disclosure. Furthermore, a configuration in which the folding apparatus 300 and the envelope processing apparatus 100 are connected in-line so as to be able to cooperate corresponds to an enclosing system according to an embodiment of the present disclosure.

The image forming apparatus 200 is an example of an apparatus that forms an image on a sheet medium by a specified image forming method and ejects the sheet medium. Below, the sheet medium is simply referred to as a "sheet S". Examples of the image formed on the sheet S include, but not limited to, an address to be formed on the sheet S. The address formed on the sheet S corresponds to an "image" in a sense. In the present specification, information including an address is referred to as "specific information".

In addition, a sheet S that has been subjected to predetermined folding processing in the folding apparatus 300 described later is referred to as a "folded sheet Sf". In other words, examples of the "enclosure" according to the description of the present embodiment include, but not limited to, both the sheet S ejected downstream from the image forming apparatus 200 and conveyed into the envelope processing apparatus 100 without being subjected to folding processing, and the folded sheet Sf conveyed into the envelope processing apparatus 100 after being subjected to folding processing.

The instruction to perform or not to perform the folding processing on the sheet S ejected from the image forming apparatus 200 is included in examples of a control instruction to the controller (printer controller 260 which will be described later) disposed in the image forming apparatus 200. For example, the control instruction is sent from the printer controller 260 on the basis of information input by a user of the image forming system 1. Alternatively, it is an instruction based on information input by a user of the image forming system 1 to a folding controller 320 included in the folding apparatus 300. The sheet S or the folded sheet Sf may or may not be subjected to image formation processing, and in the description of the present embodiment, it does not matter whether image formation processing is performed.

The position and the number of folds formed in the sheet S are based on the position adjustment information supplied to the folding apparatus 300. The position adjustment information may be supplied from the envelope processing apparatus 100 disposed downstream from the folding apparatus 300, or may be supplied from the image forming apparatus 200 disposed upstream from the folding apparatus 300.

The envelope processing apparatus 100 performs an enclosing process of enclosing a sheet S or a folded sheet Sf, which is an enclosure ejected from an apparatus (e.g., the image forming apparatus 200 or the folding apparatus 300) disposed on an upstream side in a direction (conveyance direction) in which the sheet S is conveyed into the envelope processing apparatus 100, into an envelope E. The envelope processing apparatus 100 also performs a sealing process of sealing the envelope E in which the enclosure is enclosed. The envelope processing apparatus 100 may directly eject the sheet S and the folded sheet Sf to an apparatus disposed downstream in the conveyance direction and not perform a sealing process or other process on the sheet S or the folded sheet Sf.

The envelope processing apparatus 100 may also perform processing of enclosing the folded sheet Sf in the envelope E in a proper orientation. The "proper orientation" is an orientation with respect to a transparent window ew that is formed on the envelope E so that information such as address formed on the folded sheet Sf serving as an enclosure is visible from the outside of the envelope E via the transparent window ew. A plurality of kinds (folding types) of folding processing are performed on the folded sheet Sf. The orientation of information such as an address with respect to the conveyance direction is different depending on the folding type.

The envelope processing apparatus 100 determines whether to reverse, according to the folding type, the orientation of the folded sheet Sf with respect to the direction orthogonal to the conveyance direction when the folded sheet Sf is conveyed. The envelope processing apparatus 100 includes a conveying mechanism that, in the case where reverse processing is required, reverses the folded sheet Sf by using a conveyance path on the upstream side of the enclosing position and conveys the folded sheet Sf to the enclosing position. Details of the reverse control and the conveyance control for the folded sheet Sf are described below. The envelope processing apparatus 100 can also enclose the sheet S as an enclosure that has not been subjected to folding processing in the envelope E.

In addition, the envelope processing apparatus 100 adjusts the relative position when the envelope E is held at the enclosing position, based on the position of the specific information that changes depending on the folding type, so that the specific information can be visually recognized from the outside when the enclosure is inserted in the envelope E.

The post-processing apparatus 400 is an apparatus that performs post-processing, such as stapling processing, instructed via a controller on the sheet S or the folded sheet Sf ejected by the upstream apparatus from the post-processing apparatus 400 in the conveyance direction.

In the present embodiment, the envelope E and the enclosure (the sheet S and the folded sheet Sf) are conveyed to the position (the enclosing position) where the enclosing process is performed in the envelope processing apparatus 100, and the enclosure is caused to enter the envelope E in the envelope processing apparatus 100. The envelope E containing the enclosure is conveyed to a position (enclosing position) where the sealing process is performed, sealed, and ejected.

The "coordinate axes" for clarifying directions used in the description of the present embodiment are described below. As illustrated in FIG. 1, an axis that is parallel to a placement surface of the image forming system 1 and extends in a direction in which the apparatuses of the image forming system 1 are arranged is a Y axis. A direction of an arrow indicating the Y axis is referred to as a "+Y direction" and an opposite direction to the +Y direction is referred to as a "−Y direction". The sheet S on which an image is formed in the image forming apparatus 200 is conveyed in the +Y direction, and then conveyed to each apparatus disposed downstream in the +Y direction from the image forming apparatus 200.

Similarly, an X axis defines an axis that is parallel to the placement surface on which the image forming system 1 is placed and extends in a front-rear direction of the image forming system 1. A direction of an arrow indicating an X axis is referred to as an "+X direction" and an opposite direction to the +X direction is referred to as an "−X direction". The X direction corresponds to a direction orthogonal to the conveyance direction of the enclosure. The X direction corresponds to a width direction of the sheet S, the folded sheet Sf, and the envelope E.

A Z axis defines an axis that is perpendicular to the X axis and the Y axis and extends in a height direction of the image forming system 1. A direction of arrow indicating the Z axis is referred to as +Z direction and a direction opposite to the +Z direction is referred to as "−Z direction".

When the same coordinate axes as those described above are appended to the drawings used in the following description, the definitions of the directions used in the description are the same as those described above.

The sheet S on which an image is formed in the image forming apparatus 200 is conveyed in the +Y direction, and then conveyed to the apparatuses disposed downstream from the image forming apparatus 200. Accordingly, the +Y direction is substantially synonymous with the conveyance direction. In the envelope processing apparatus 100, the conveying-in direction of the sheet S is the +Y direction. However, the conveyance direction of the sheet S and the folded sheet Sf in the enclosing and sealing operation is the +Z direction.

In other words, in the image forming system 1, a main conveyance direction in which the envelope E is conveyed to the enclosing position and a main conveyance direction in which the enclosure is conveyed to the enclosing position are different directions. Specifically, the conveyance direction of the envelope E is the Z direction, and the conveyance direction of the enclosure is the Y direction. Furthermore, the main conveyance direction in which the envelope E is conveyed to the enclosing position is the "+Z direction", and the main conveyance direction in which the envelope E is conveyed from the enclosing position to the ejection position is the "−Z direction".

Figure 2:
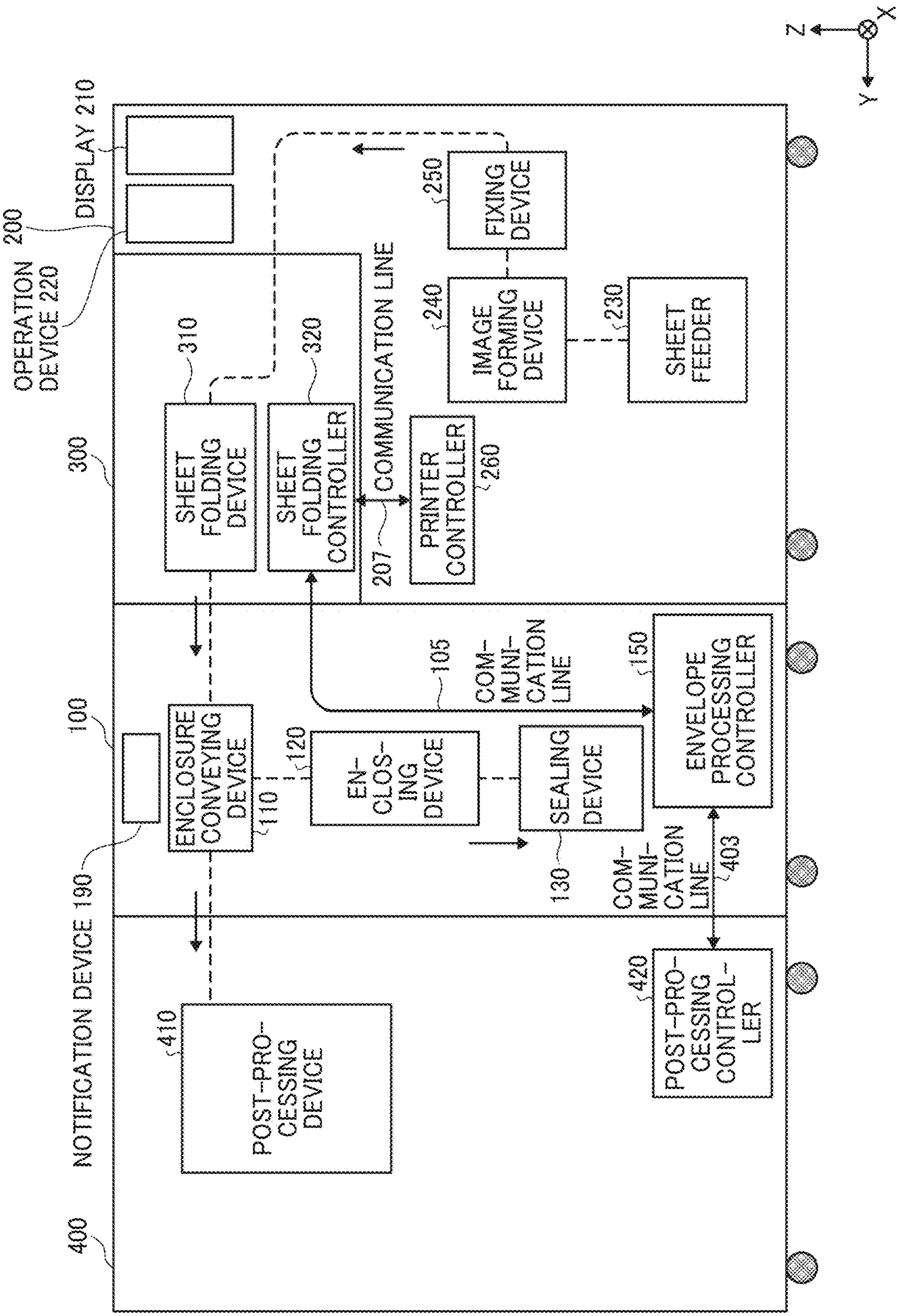
FIG. 2 is a block diagram illustrating a configuration of control of the image forming system of FIG. 1.

Functional blocks of the image forming system 1 are described below with reference to FIG. 2. In the following description, an enclosure that is conveyed to the envelope E is assumed to be a folded sheet Sf on which an image is formed in the image forming apparatus 200 and on which specified folding processing is performed in the folding apparatus 300. In FIG. 2, a movement path (conveyance path) of the folded sheet Sf is indicated by a broken line. A communication line used for sending and receiving of signals between the functional blocks is indicated by a solid line. A movement path (conveyance path) of the sheet S is also indicated by a broken line.

The image forming apparatus 200 is, for example, an apparatus that forms an image on a sheet S by an electrophotographic process. The image forming apparatus 200 includes a display 210, an operation device 220, a sheet feeder 230, an image forming device 240, a fixing device 250, and a printer controller 260.

The display 210 displays screens for notifying a user of states of various functions and operation contents. The operation device 220 corresponds to an operation interface with which a user performs a setting operation of a processing operation mode or the number of prints to be processed, and a setting operation of a setting that requires reverse processing when the enclosing process is performed in the envelope processing apparatus 100. The sheet feeder 230 includes a sheet feeding mechanism that stores sheets S and separates and feeds the sheets S one by one. The image forming device 240 forms a latent image on a photoconductor and transfers an image onto the sheet S. The fixing device 250 fixes the image transferred on the sheet S. The printer controller 260 controls operations of the above-described functional blocks.

The folding apparatus 300 according to the present embodiment includes a sheet folding device 310 and a folding controller 320. The sheet folding device 310 has a configuration of performing a plurality of different types of folding processing described below. The folding controller 320 controls the sheet folding device 310 to perform the folding processing and the number of times of folding designated by a user. In addition, as described later, the folding controller 320 also controls additional folding processing and the number of times of additional folding processing in order to adjust conveyance intervals of enclosures. The folding controller 320 also executes crease adjustment control processing so that a crease is formed at a position designated by a user, in the folding processing executed in the sheet folding device 310.

A description is given below of the sheet folding device 310 as a folding processing device according to an embodiment of the present disclosure that performs different folding types with reference to FIGS. 25A to 25E, 26A to 26F, and 27A to 27D. In the following description, the sheet folding device 310 illustrated in FIGS. 25A to 25E is referred to as "type A". The sheet folding device 310 illustrated in FIGS. 26A to 26F and FIGS. 27A to 27D is referred to as "type B". In the following description, image formation processing is performed on one side of the sheet S.

In FIGS. 25A to 25E, 26A to 26F, and 27A to 27D, the components of the sheet folding device 310 may be denoted by different reference signs even if the components have the same functions, operations, and effects. In the range of each of the A type and the B type, the reference signs are consistently given, but may be different from the reference signs in the other drawings.

A description is given below of the sheet folding device 310 of type A.

As illustrated in FIGS. 25A to 25E, a lower surface of the sheet S conveyed in the conveyance direction from the image forming apparatus 200 to the sheet folding device 310 corresponds to the image forming surface Ps.

Figure 25A:
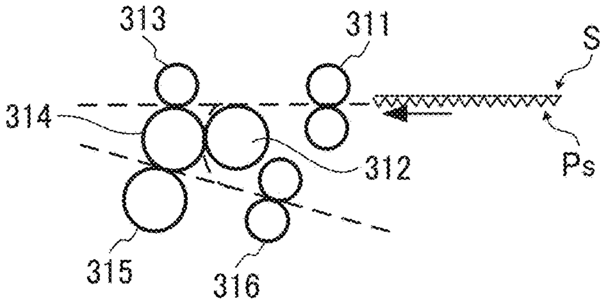
FIGS. 25A to 25E are diagrams each illustrating an internal configuration of a folding processing section applicable to the image forming system of FIG. 1, according to an embodiment of the present disclosure.

First, as illustrated in FIG. 25A, the sheet S is conveyed from the image forming apparatus 200 toward a conveying roller pair 311.

Figure 25B:
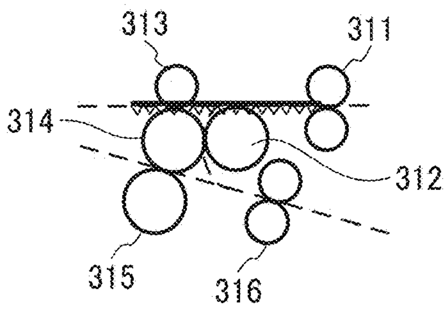

As illustrated in FIG. 25B, the sheet S conveyed downstream by the conveying roller pair 311 is conveyed to a predetermined position by a first folding roller 312, a first folding conveying roller 313, and a second folding roller 314.

Figure 25C:
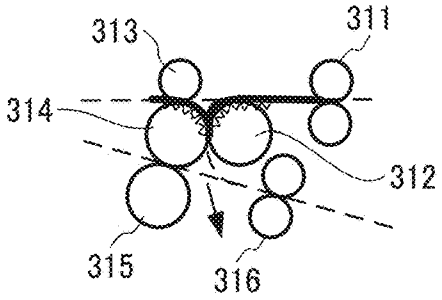

Subsequently, as illustrated in FIG. 25C, the first folding conveying roller 313 and the second folding roller 314 are rotated in reverse to form a first crease on the sheet S.

Figure 25D:
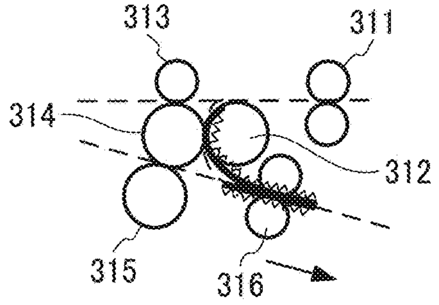

As illustrated in FIG. 25D, the sheet S on which the first crease is formed is conveyed by the first folding roller 312, the second folding roller 314, and a second folding conveying roller pair 316 to a path different from a path through which the sheet S enters, and is stopped at a predetermined position.

Figure 25E:
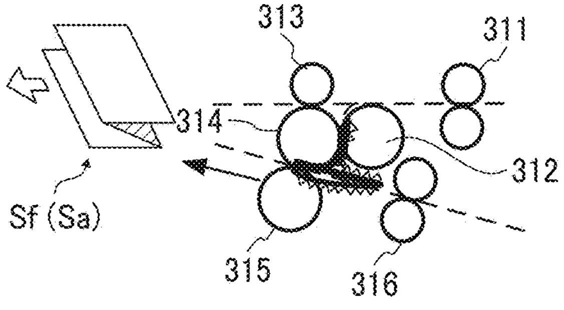

Subsequently, as illustrated in FIG. 25E, the second folding conveying roller pair 316 is rotated in reverse, and a third folding roller 315 is also rotated to convey the sheet S in a downstream direction. By this operation, a second crease is formed. Thus, the folded sheet Sf of outer three-folding or 6-page accordion is completed. In this case, the image forming surface Ps of the folded sheet Sf is positioned on a lower surface of the folded sheet Sf in the conveyance direction.

Figure 26C:
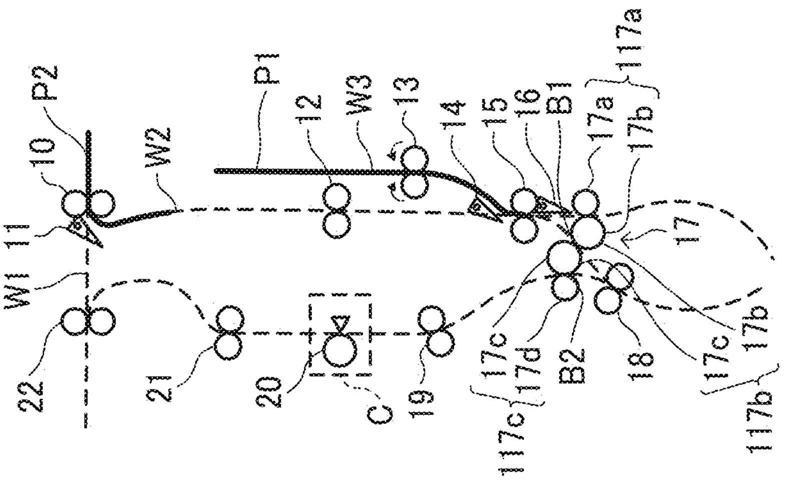
FIGS. 26A to 26F are diagrams each illustrating an internal configuration of a folding processing section applicable to the image forming system of FIG. 1, according to an embodiment of the present disclosure.

A description is given below of the sheet folding device 310 of type B. FIGS. 26A to 26F are diagrams illustrating a sheet overlay operation performed by an overlay processing section of the sheet folding device 310. As illustrated in FIG. 26A, a first preceding sheet P1 is conveyed to a folding processing conveyance path W2. A leading end of the first preceding sheet P1 conveyed to the folding processing conveyance path W2 contacts a registration roller pair 15 to correct a skew of the first preceding sheet P1. This skew correction may not be performed.

Subsequently, the registration roller pair 15 and a first conveying roller pair 117*a* serving as a first conveyor including a first pressing roller 17*a* and a first folding roller 17*b* convey the first preceding sheet P1 forward (i.e., conveyance in a specified direction). Next, when a trailing end of the first preceding sheet P1 has passed through a branching portion between the folding processing conveyance path W2 and a switchback conveyance path W3, the conveyance of the first preceding sheet P1 is stopped. Then, a second branching plate 14 serving as a second branching member is rotated in a clockwise direction in FIG. 28A, and the posture of the second branching plate 14 is switched to guide the first preceding sheet P1 to the switchback conveyance path W3.

Figure 26B:
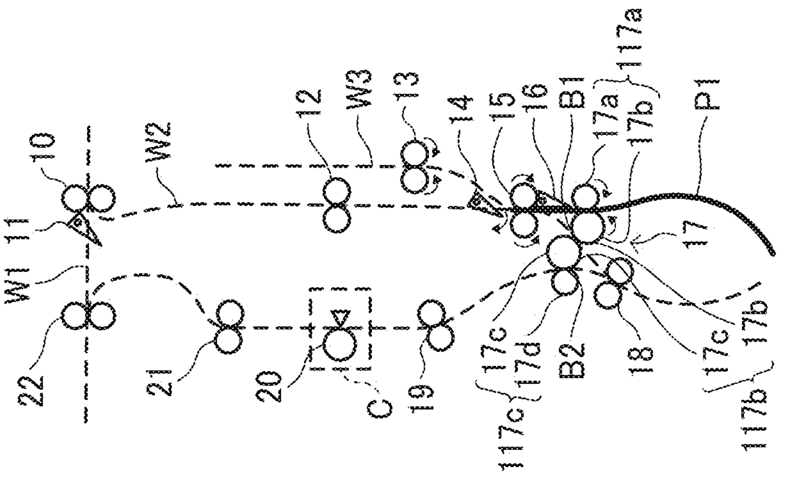
Figure 26A:
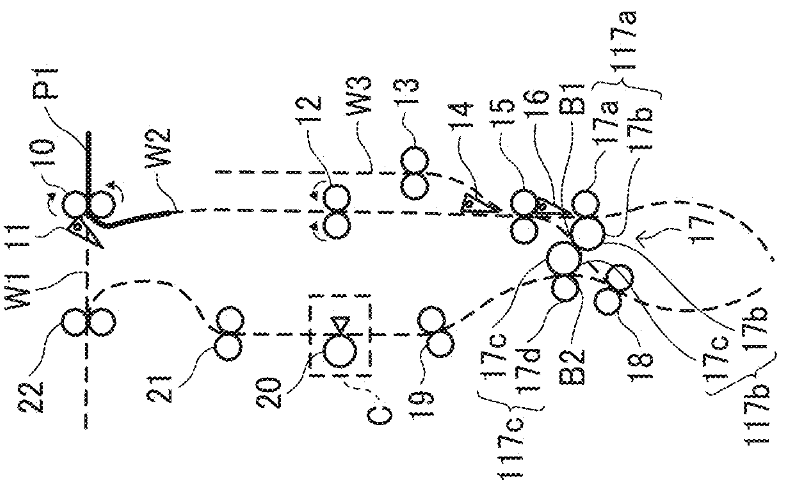

Then, as illustrated in FIG. 26B, the registration roller pair 15, the first conveying roller pair 117*a*, and a switchback conveying roller pair 13 are rotated in reverse. As a result, the first preceding sheet P1 is conveyed in reverse (conveyed in a direction opposite to a specified direction), and the first preceding sheet P1 is conveyed to the switchback conveyance path W3. When the leading end of the first preceding sheet P1 during forward conveyance (i.e., conveyance in a specified direction) is conveyed to the switchback conveyance path W3, the sheet conveyance of the switchback conveying roller pair 13 is stopped.

After the conveyance of the first preceding sheet P1 has stopped, as illustrated in FIG. 26C, the switchback conveying roller pair 13 conveys the first preceding sheet P1 forward (conveys the first preceding sheet P1 in the specified direction), causes the leading end of the first preceding sheet P1 to contact against the registration roller pair 15, and causes the first preceding sheet P1 to be on standby with skew corrected.

In this way, the preceding sheet P1 is conveyed to the switchback conveyance path W3 to evacuate from the folding processing conveyance path W2. The first preceding sheet P1 does not obstruct the conveyance of a subsequent sheet P2, thereby enabling smooth conveyance of the subsequent sheet P2.

Figure 26D:
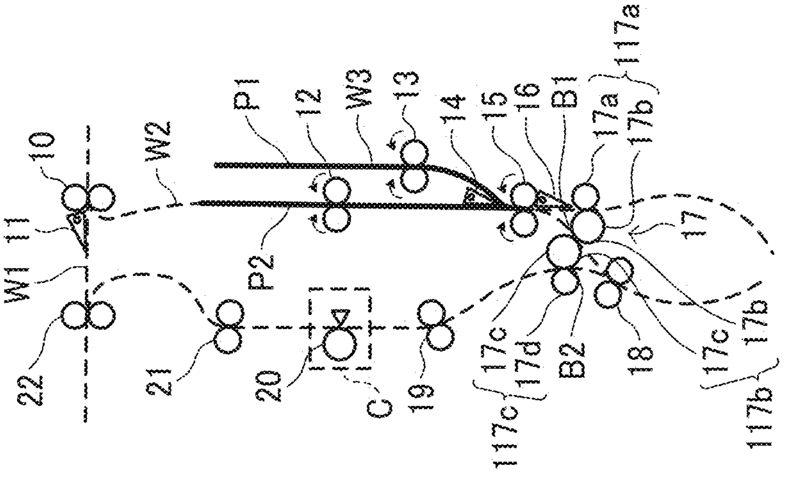

Subsequently, a leading end of the second subsequent sheet P2 contacts the registration roller pair 15. As illustrated in FIG. 26D, after the leading end of the subsequent sheet P2 contacts the registration roller pair 15, a conveying roller pair 12 continues to convey the subsequent sheet P2 to bend the subsequent sheet P2 and perform skew correction.

Figure 26E:
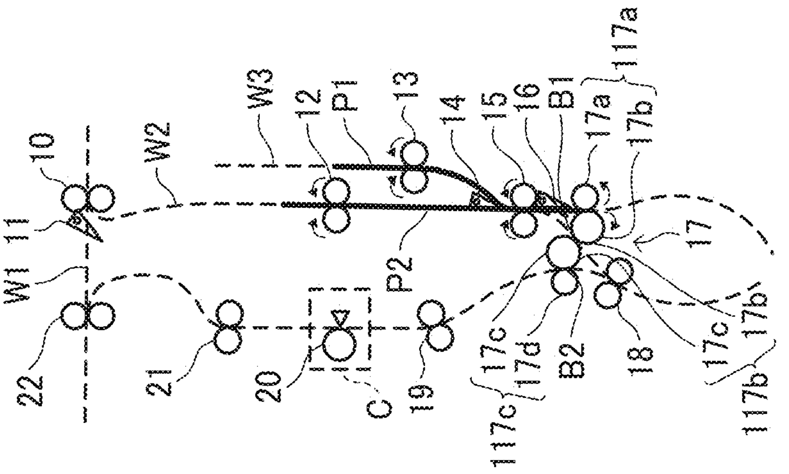
Figure 26F:
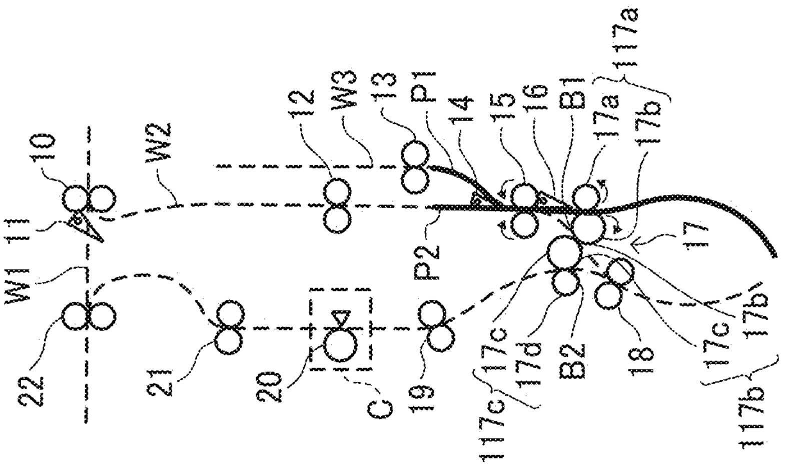

After a specified time in which the subsequent sheet P2 is bent by a specified deflection amount has passed, as illustrated in FIG. 26E, the registration roller pair 15, the switchback conveying roller pair 13, and the first conveying roller pair 117*a* rotate. The registration roller pair 15 conveys the first preceding sheet P1 and the second subsequent sheet P2 in an overlaid manner.

When the number of overlaid sheets reaches the number set by a user, a folding processing section B starts to perform multi-folding processing. On the other hand, when the number of overlaid sheets does not reach the number set by the user, the overlaid sheets are conveyed in reverse (conveyed in a reverse direction of the specified direction), when the trailing end of the overlaid sheets has passed the second branching plate 14, and are evacuated to the switchback conveyance path W3. The sheets can be overlaid by repeating the above-described operation depending on the number of sheets to be overlaid.

In the present embodiment, as described above, the skew of the subsequent sheet P2 is corrected without stopping the rotation of the conveying roller pair 12, and the registration roller pair 15 starts to rotate when the bending amount of the subsequent sheet P2 has reached a specified amount. Thus, the preceding sheet P1 and the subsequent sheet P2 are overlaid without reducing productivity.

While the number of the overlaid sheets does not reach the number set by the user, overlay processing without the skew correction by the registration roller pair 15 may be performed. When the number of the overlaid sheets reaches the number set by the user, overlay processing with the skew correction by the registration roller pair 15 may be performed. In the registration processing with skew correction, a leading end of a preceding sheet (sheet bundle) is contacted against a registration roller pair to wait in a state where skew correction is performed, and a subsequent sheet is contacted against the registration roller pair to perform skew correction, and then, the subsequent sheets are overlaid and conveyed. On the other hand, in the overlay processing without the skew correction, the leading end of the preceding sheet P1 (sheet bundle) is on standby in a state where the preceding sheet P1 is evacuated in the switchback conveyance path W3. The switchback conveying roller pair 13 starts to convey the preceding sheet P1 (sheet bundle) so that the preceding sheet P1 evacuated in the switchback conveyance path W3 reaches the registration roller pair 15 when the subsequent sheet P2 reaches the registration roller pair 15. Thus, the switchback conveying roller pair 13 overlays the sheets, and the registration roller pair 15 conveys the overlaid sheets.

FIGS. 27A to 27D are diagrams illustrating a typical operation when the folding processing section of the sheet folding device 310 of type B performs Z folding processing against the sheet S. The leading end of a sheet bundle Pt conveyed by the registration roller pair 15 after the overlay processing enters the first conveying roller pair 117*a* including the first folding roller 17*b* and the first pressing roller 17*a*. When the sheet bundle Pt is conveyed by a predetermined conveyance amount Δ1, a drive motor to drive a folding mechanism 17 rotates in reverse. The protrusion amount is appropriately determined depending on the length of the sheet bundle Pt in the sheet conveyance direction and the content of the folding processing such as folding manner.

Figure 27A:
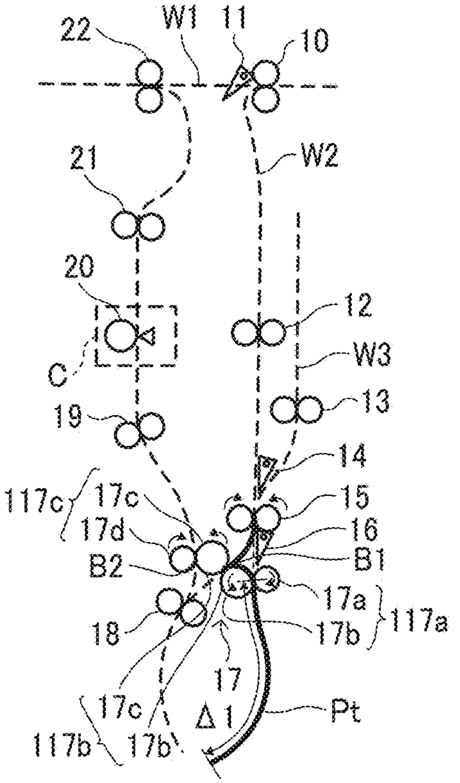
FIGS. 27A to 27D are diagrams each illustrating an internal configuration of a folding processing section applicable to the image forming system of FIG. 1, according to an embodiment of the present disclosure.

The drive motor to drive the folding mechanism 17 is rotated in reverse to convey the sheet bundle Pt nipped by the first conveying roller pair 117*a* in reverse (convey the sheet bundle Pt in a direction opposite to a specified direction). This operation forms a bend in the sheet bundle portion between the registration roller pair 15 and the first conveying roller pair 117*a* as illustrated in FIG. 27A. This bend portion, which is also called a folded-back portion, enters a nip of a first folding roller pair 117*b* serving as a first folding unit including the first folding roller 17*b* and a second folding roller 17*c* to form a first folded portion in the folded-back portion. The first folded portion that has passed a nip of the first folding roller 17*b* is conveyed toward a second conveying roller pair 18 serving as a second conveyor.

The first folded portion of the sheet bundle Pt enters the nip of the second conveying roller pair 18. When the second conveying roller pair 18 conveys the sheet bundle Pt by a predetermined conveyance amount 42, the second conveying roller pair 18 rotates in reverse and conveys the sheet bundle Pt nipped by the second conveying roller pair 18 in reverse (conveys the sheet bundle Pt in the direction opposite to the specified direction). The conveyance amount Δ2 in this case is appropriately determined depending on the length of the sheet bundle Pt in the sheet conveyance direction and the content of the folding processing such as folding manner.

The reverse conveyance (conveyance in the direction opposite to the specified direction) of the sheet bundle Pt nipped by the second conveying roller pair 18 in reverse forms a bend in the sheet portion between the first folding roller pair 117*b* and the second conveying roller pair 18.

Figure 27B:
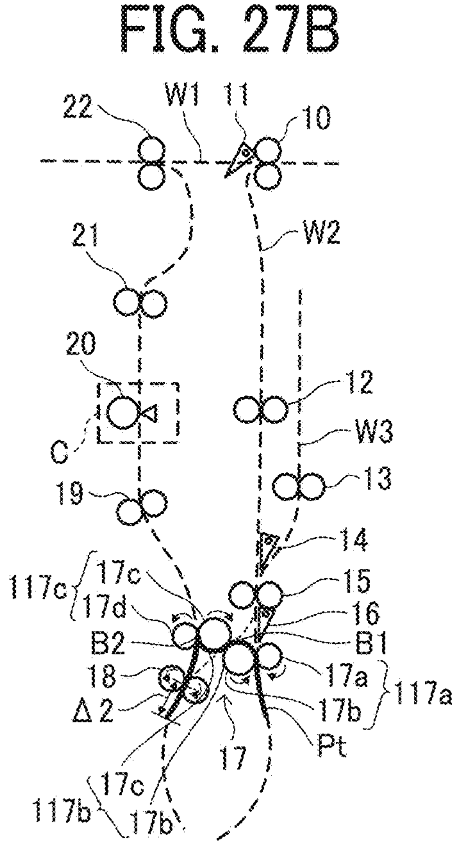

As illustrated in FIG. 27B, this bent portion (a folded-back portion) enters a nip between a second folding roller pair 117*c* serving as a second folding unit including the second folding roller 17*c* and a second pressing roller 17*d* to form a second folded portion in the folded-back portion.

Figure 27C:
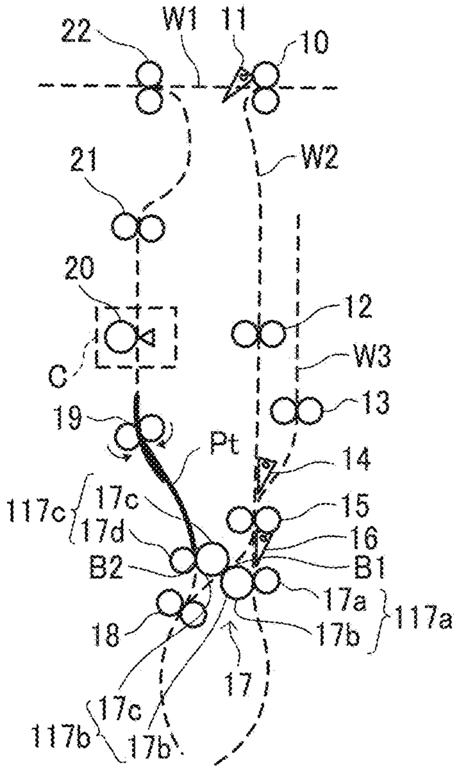

As illustrated in FIG. 27C, an intermediate conveying roller pair 19 conveys the sheet bundle Pt, which has passed the nip of the second folding roller pair 117*c* and has the two folded portions formed as described above, toward an additional folding roller 20.

Figure 27D:
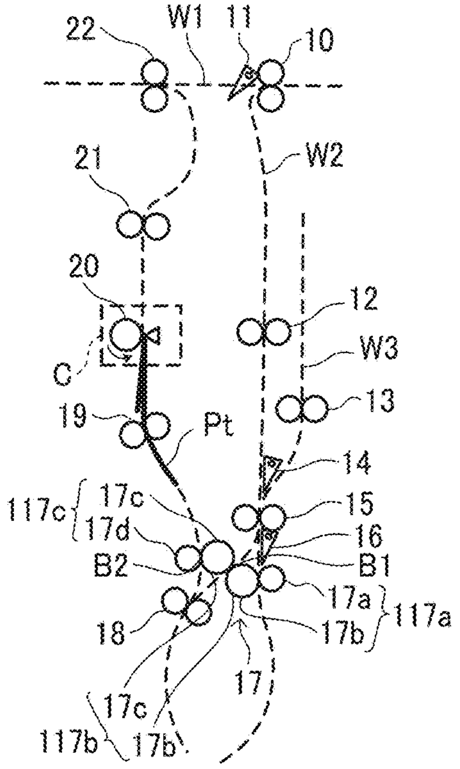

As illustrated in FIG. 27D, when the second folded portion has reached the position opposite the additional folding roller 20, the conveyance of the sheet bundle Pt is stopped. Subsequently, the additional folding roller 20 is rotated to put a sharp crease at the second folded portion, and then, the conveyance of the sheet bundle Pt is resumed. When the first folded portion has reached the position opposite the additional folding roller 20, the conveyance of the sheet bundle Pt is stopped. The additional folding roller 20 is rotated to put a sharp crease at the first folded portion, and then, the conveyance of the sheet bundle Pt is resumed. Two conveying roller pairs 21 and 22 convey the sheet bundle Pt to eject the sheet bundle Pt to the post-processing apparatus 400.

The above description is about the case where the sheet bundle Pt having been subjected to the overlay processing is folded. The folding processing operation of folding one sheet is also performed in a similar manner. In the above description, Z-folding processing is described. The same operation as the Z-folding processing in which the conveyance amount Δ1 and the conveyance amount Δ2 are properly changed enables performing the inner three-folding and the outer three-folding. In two-folding processing, a third branching plate 16 serving as a third branching member is rotated in a clockwise direction in FIGS. 27A to 27D to take a posture for guiding the sheet to the first folding roller pair 117*b*. Then, the sheet conveyed from the registration roller pair 15 is conveyed to the first folding roller pair 117*b*. The same operation as the above-described operation to form the second folded portion forms the folded portion at the center of the sheet in the sheet conveyance direction, which enables the two-folding to be performed.

In other words, the folding apparatus 300 according to the present embodiment includes a folding position adjustor that can adjust the position at which a crease is formed in a plurality of different types of folding processing.

Returning to FIG. 2, a description is given below. The envelope processing apparatus 100 includes an enclosure conveying device 110, an enclosing device 120, a sealing device 130, and an envelope processing controller 150.

The enclosure conveying device 110 performs sheet conveyance processing of conveying the folded sheet Sf, which is conveyed from the sheet folding device 310 to the enclosing position, depending on the orientation of the image forming surface Ps of the folded sheet Sf. The term "sheet conveyance processing" represents conveyance processing executed in accordance with various adjustment values (data used for execution of a print job instructed by a user, including, e.g., the type of folding and the position of a printed surface) transmitted from the folding controller 320 to the envelope processing controller 150 through a communication line 105. The enclosure conveying device 110 performs, for example, the conveyance processing of conveying the folded sheet Sf downstream in the conveyance direction or the reverse conveyance processing of replacing ends of the folded sheet Sf in the conveyance direction. The folded sheet Sf is conveyed to the enclosing device 120 or the post-processing apparatus 400 by the conveyance processing or the reverse conveyance processing.

The enclosing device 120, which is an enclosing device and serves as an enclosing section, includes a mechanism that moves the envelope E to a position where the folded sheet Sf conveyed from the enclosure conveying device 110 can be enclosed, causes the envelope E to be on standby at the enclosing position, and encloses an enclosure into the envelope E which is on standby. The enclosing device 120 includes a mechanism that opens a flap ef so that the opening of the envelope E is opened before the envelope E reaches the enclosing position. The enclosing device 120 also includes a mechanism that calculates the length of the envelope E (the dimension in the direction in which the enclosure is enclosed) and the length of the flap ef before the envelope E has reached the enclosing position. With the mechanisms, the enclosing process of the folded sheet Sf is performed on the envelope E that is held at the enclosing position with an opening of the envelope E open. Furthermore, with the mechanisms, the enclosing device 120 also performs position adjustment processing for the envelope E so that the relative position of the specific information formed on the enclosure matches a transparent window ew, which is a type of structure of the envelope E held at the enclosing position and through which the content (enclosure) can be viewed from the outside of the envelope E. In other words, the enclosing device 120 can appropriately perform enclosing processes on envelopes E of various types and sizes.

The sealing device 130 performs processing of ejecting the sealed envelope E to an envelope ejection tray 134 after the flap ef of the envelope E in which the folded sheet Sf has been enclosed is closed.

The envelope processing controller 150 controls the operations of the plurality of conveying roller pairs, which are included in the enclosure conveying device 110, the enclosing device 120, and the sealing device 130, and the operation of the switching plate that switches the conveyance path of the envelope E. The configuration of the envelope processing controller 150 that controls the enclosing process may be a configuration included in the enclosing device 120 serving as an enclosing device.

The envelope processing controller 150 is a controller that performs conveyance control including reversing control and enclosing control of the folded sheet Sf. The envelope processing controller 150 receives "enclosing target information", which is data included in various adjustment values and information related to the folded sheet Sf, from the printer controller 260 and the folding controller 320. The conveyance control is performed based on the content indicated by each piece of information included in the received enclosing target information.

The term "enclosing target information" is information related to the sheet S or the folded sheet Sf as enclosures to be enclosed. More specifically, the "enclosing target information" includes information for controlling an end (a leading end in a conveyance direction) that is a top of the sheet S or the folded sheet Sf when the sheet S or the folded sheet Sf is enclosed in the envelope E to be an end on a desired side. Examples of the enclosing target information include "folding type information" that indicates the type of folding processing having been subjected to the folded sheet Sf and whether additional folding is performed on the folded sheet Sf. Examples of operation instruction information from the image forming apparatus 200, which is one of upstream side apparatuses, include "reversal necessity information" which defines necessity of the reversal conveyance processing described below. Examples of the operation instruction information also include print surface information indicating an image forming surface on which an image is formed on the folded sheet Sf. Examples of the operation instruction information further include "processing device information" indicating the type of the sheet folding device 310 that has performed the folding processing.

The post-processing apparatus 400 includes a post-processing device 410 and a post-processing controller 420. The post-processing device 410 executes specified post-processing on the sheet S conveyed from the upstream side under the control of the post-processing controller 420. The post-processing controller 420 controls the post-processing operation in the post-processing controller 420 depending on the operation mode transmitted from the printer controller 260, the folding controller 320, and the envelope processing controller 150 through a communication line 403.

The printer controller 260, the folding controller 320, the envelope processing controller 150, and the post-processing controller 420 are connected to each other, and exchange information necessary for control through communication lines 207, 105, and 403. Accordingly, the controllers 260, 320, 150, and 420 cooperate with each other to share the sheet size and information about the processing mode requested by a user to be performed on the sheet S and the folded sheet Sf. As a result, the entirety of the image forming system 1 shares control information that allows each of the mechanisms described above to perform specified processing with specified timing and a specified process.

The envelope processing controller 150 that performs a central control operation in the present embodiment includes a central processing unit (CPU) as an arithmetic processing unit, and a read-only memory (ROM) and a random-access memory (RAM) as storage devices. The envelope processing controller 150 includes an interface that outputs control signals to conveying roller pairs and inputs signals from the conveying roller pairs, and an interface that receives output signals from sensors. The operation of the envelope processing apparatus 100 is controlled by control programs that can execute control processing using the above-described hardware resources. Details of functional blocks of the envelope processing controller 150 are given below.

Similarly to the envelope processing controller 150, the printer controller 260, the folding controller 320, and the post-processing controller 420 also control the operations of hardware mechanisms by control programs that perform respective functions using hardware resources including, for example, the CPU, the ROM, and the RAM.

In FIGS. 1 and 2, the example in which the post-processing apparatus 400 is coupled to the downstream side of the envelope processing apparatus 100 is illustrated as an example of the configuration of the image forming system 1. Typical examples of the post-processing apparatus 400 include a finisher that performs stapling processing, a stacker, and a bookbinding machine. The system configuration of the image forming system 1 may be such a configuration in which the envelope processing apparatus 100 is located on the most downstream side.

A description is given below of processing operations in the envelope processing apparatus 100.

Specifically, with reference to FIG. 3, a description is given below of a plurality of conveying roller pairs of the enclosure conveying device 110, the enclosing device 120, and the sealing device 130 disposed in the envelope processing apparatus 100, and a mechanism for switching a conveyance path and a conveyance direction of a conveyed object.

A description is given below of the structure of the enclosure conveying device 110 according to an embodiment of the present disclosure.

Figure 3:
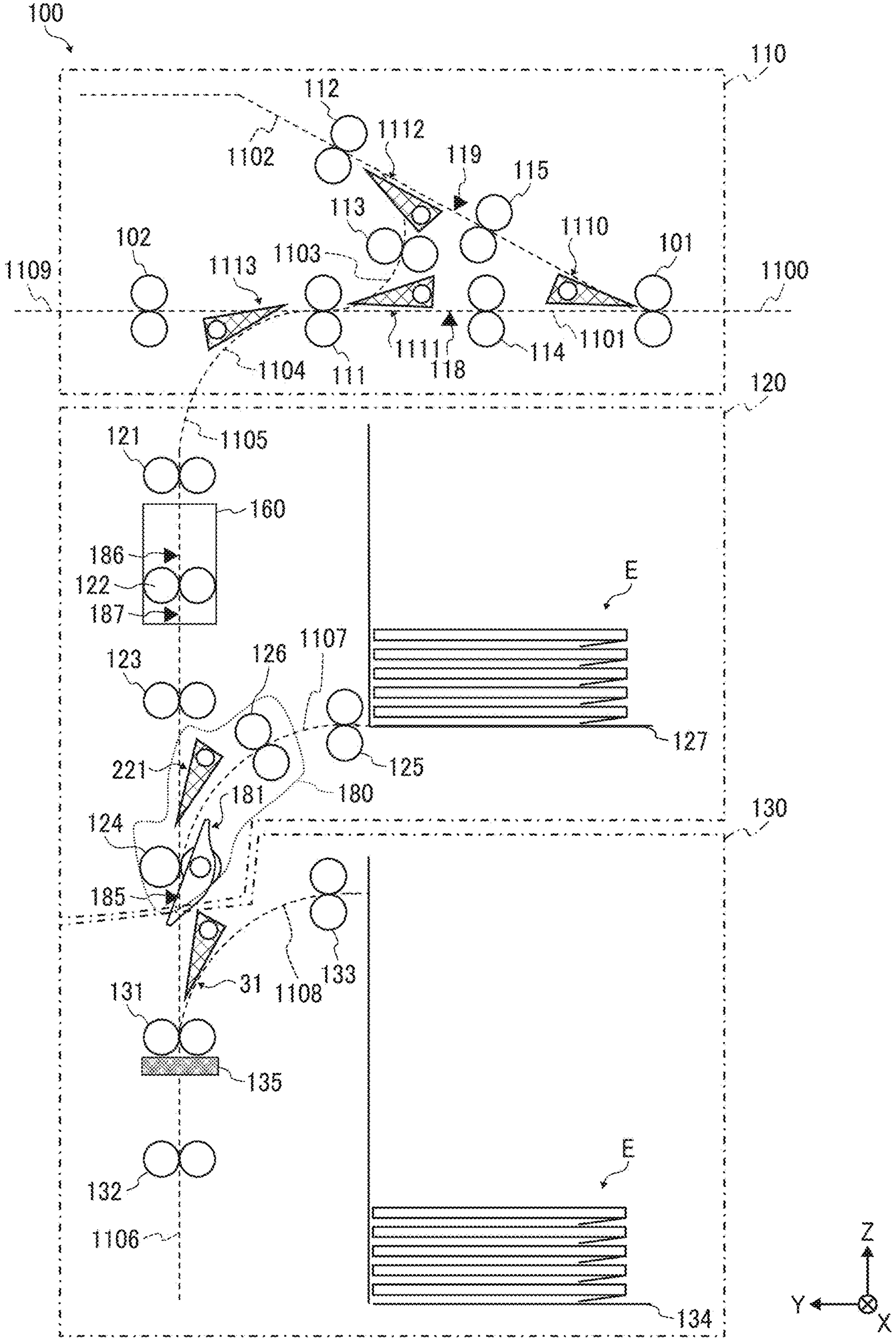
FIG. 3 is a diagram illustrating an internal configuration of an envelope processing apparatus according to an embodiment of the present disclosure.

As illustrated in FIG. 3, the enclosure conveying device 110 has a plurality of conveyance paths distinguished as an entry path 1100, a first conveyance path 1101, a second conveyance path 1102, a switchback conveyance path 1103, an enclosure conveyance path 1104 as a fourth conveyance path, and a sheet discharge path 1109. The enclosure conveying device 110 also includes a plurality of roller pairs 101, 102, 111, 112, 113, 114, and 115 and a plurality of switching plates 1110, 1111, 1112, and 1113.

The enclosure conveying device 110 performs processing of conveying an object to be conveyed to the enclosing position and processing of turning the object into an appropriate direction when the object is enclosed into the envelope E. When the enclosure conveying device 110 does not perform the enclosing process, which is described below, on the folded sheet Sf conveyed from the folding apparatus 300, the enclosure conveying device 110 causes the folded sheet Sf, which has been conveyed by an entrance roller pair 101, to pass from the entry path 1100 toward the first conveyance path 1101. The folded sheet Sf is ejected to the apparatus on the downstream side via the sheet discharge path 1109.

When the enclosure conveying device 110 performs an enclosing process, which is described below, on the folded sheet Sf conveyed from the folding apparatus 300, the enclosure conveying device 110 conveys the folded sheet Sf to the enclosure conveyance path 1104 as the fourth conveyance path that branches from the first conveyance path 1101 and communicates with an enclosing roller pair 121 holding the envelope E. As described below, the enclosure conveyance path 1104 communicates with an envelope conveyance path 1105.

A description is given below of the structure of the enclosing device 120 according to an embodiment of the present disclosure.

As illustrated in FIG. 3, the enclosing device 120 includes an envelope conveyance path 1105 connected to the enclosure conveyance path 1104 that receives the sheet S or the folded sheet Sf as an enclosure from the enclosure conveying device 110 and encloses the sheet S or the folded sheet Sf into the envelope E.

The envelope conveyance path 1105 is provided with an envelope sensor 185 that acquires a structure of an envelope as an image. The envelope sensor 185 is installed at a position where a flap opening mechanism 180 described below is disposed, and is an image sensor for acquiring transparent-portion information indicating a position of a portion of a transparent window ew included in the envelope E being conveyed through the envelope conveyance path 1105.

On the envelope conveyance path 1105, a first vertical conveying roller pair 122 and a second vertical conveying roller pair 123 serving as conveyors for conveying the envelope E are arranged at positions corresponding to a position (an enclosing position) at which the folded sheet Sf as an enclosure is inserted in the envelope E. The envelope E conveyed to the enclosing position is held at the enclosing position on the envelope conveyance path 1105. The enclosing position corresponds to a position between the enclosing roller pair 121 and the first vertical conveying roller pair 122. At the enclosing position, an enclosing support 160 is disposed on a side of the envelope conveyance path 1105.

The enclosing support 160 as an enclosing unit has a function of retracting and holding a flap ef of the envelope E, which might be an obstacle to the conveyed enclosure, from the envelope conveyance path 1105 in order to form a state in which the enclosure is easily inserted into the envelope E at the enclosing position. The flap ef is retracted from the envelope conveyance path 1105 by the enclosing support 160, which can prevent the flap ef from interfering with the insertion of the enclosure on the conveyance path along which the enclosure is conveyed toward the envelope E. Thus, smooth enclosing of the enclosure at the enclosing position can be supported.

The enclosing support 160 extends an opening of the envelope E while maintaining the flap ef at the retracted position, and performs an operation of supporting the enclosing operation so that the enclosing of the enclosure is smoothly performed. The enclosing support 160 has the function of moving (shifting) the envelope E in the width direction while holding the flap ef at the retracted position away from the envelope conveyance path 1105. Shifting the envelope E in the width direction in the enclosing support 160 allows the position of the specific information corresponding to, for example, the address information formed on the enclosure to be aligned with the transparent portion of the envelope E.

As described later, the enclosing support 160 includes a flap detection sensor 186 and a conveyance sensor 187. The details of the enclosing support 160 will be described later.

The envelope conveyance path 1105 is connected to a sealing conveyance path 1106 for performing a sealing process on the envelope E in which the enclosure is enclosed. The envelope conveyance path 1105 connects the enclosure conveyance path 1104 and the sealing conveyance path 1106 to form an envelope conveyance path.

A flap opening roller pair 124 is disposed at a junction of the envelope conveyance path 1105 and the sealing conveyance path 1106. The flap opening roller pair 124 is provided with a flap opening plate 181 in a rotatable state. The flap opening plate 181 serves as a flap opening member to open the flap ef When an envelope E is fed from the envelope load tray 127, passes through the envelope entry path 1107, and enters the envelope conveyance path 1105, the flap opening plate 181 acts on the envelope E to perform processing (flap opening processing) to open the flap ef.

The flap opening mechanism 180 is disposed in the vicinity of a merging position of the envelope entry path 1107 and the envelope conveyance path 1105.

An envelope switchback switching plate 221 for switching the conveyance direction of the envelope E is disposed at a junction where the envelope conveyance path 1105 and the envelope entry path 1107 join each other. The envelope switchback switching plate 221 serving as an envelope switchback switching member is also included in the flap opening mechanism 180.

A separation roller pair 125 and an envelope conveying roller pair 126 are disposed on the envelope entry path 1107 for supplying the envelope E to the envelope conveyance path 1105. The envelope load tray 127 is disposed at an end of the envelope entry path 1107. Together with the envelope conveyance path 1105, the envelope entry path 1107 also constitutes the envelope conveyance path.

As illustrated in FIG. 3, multiple envelopes E are placed on the envelope load tray 127. The envelope E placed on the envelope load tray 127 is in a state where the bottom, which is an opposite end of the flap ef, faces the separation roller pair 125. When the envelope E is ejected from the envelope load tray 127, the leading end of the envelope E in the conveyance direction corresponds to the bottom of the envelope E. Accordingly, the end having the flap ef is the trailing end of the envelope E in the conveyance direction.

One envelope E is picked up from multiple envelopes E placed on the envelope load tray 127 by the separation roller pair 125 and passes the envelope entry path 1107 by the separation roller pair 125 and the envelope conveying roller pair 126 and is conveyed to a position beyond the envelope switchback switching plate 221. When the trailing end of the envelope E in the conveying direction has reached a position beyond a tip (a rotating end) of the envelope switchback switching plate 221 together with the conveyance by the flap opening roller pair 124, the envelope switchback switching plate 221 rotates and switches to a state in which the envelope E can be conveyed in a switchback manner.

In other words, the envelope switchback switching plate 221 pivots between a first position and a second position. In the present embodiment, the first position is a position at which the envelope E fed from the envelope load tray 127 is once conveyed to the sealing conveyance path 1106 through the envelope conveyance path 1105. The second position is a position at which the envelope E is conveyed toward the enclosure conveying device 110 in the envelope conveyance path 1105.

When the envelope switchback switching plate 221 is placed at the first position, the tip of the envelope switchback switching plate 221 is placed at a position at which the envelope switchback switching plate 221 does not straddle the envelope entry path 1107, and forms a state in which the envelope E can move to the envelope conveyance path 1105. When the envelope switchback switching plate 221 is placed at the second position, the tip of the envelope switchback switching plate 221 is placed at a position at which the envelope switchback switching plate 221 straddles the envelope entry path 1107. Thus, the envelope switchback switching plate 221 forms a state in which the envelope E is conveyed in the switchback manner and can move from the sealing conveyance path 1106 to the envelope conveyance path 1105. The envelope switchback switching plate 221 switches the conveyance direction of the envelope E in the envelope conveyance path 1105.

The first vertical conveying roller pair 122 and the second vertical conveying roller pair 123 convey and hold the envelope E to the enclosing position as a specified position in the envelope conveyance path 1105. As described below, the enclosing position is a position at which the position of the opening of the envelope E (i.e., the position of the flap ef) is lower than the enclosing roller pair 121 and higher than the first vertical conveying roller pair 122.

The enclosing roller pair 121 is a type of conveying roller pair that rotates in a direction in which the folded sheet Sf conveyed from the enclosure conveying device 110 is enclosed into the envelope E.

A description is given below of the structure of the sealing device 130 according to an embodiment of the present disclosure.

As illustrated in FIG. 3, the sealing device 130 includes a third vertical conveying roller pair 131 and a fourth vertical conveying roller pair 132 on the sealing conveyance path 1106. A sealer 135 serving as a sealer is disposed between the third vertical conveying roller pair 131 and the fourth vertical conveying roller pair 132. The sealer 135 closes the flap ef of the envelope E in which the enclosure is enclosed.

The third vertical conveying roller pair 131 and the fourth vertical conveying roller pair 132 convey and hold the envelope E to and at a specified position in the sealing conveyance path 1106.

An envelope ejection switching plate 31 is disposed at the branching position at which an envelope ejection path 1108 branches from the sealing conveyance path 1106. An envelope ejection roller pair 133 is disposed at an end of the envelope ejection path 1108. The envelope ejection roller pair 133 is a roller pair that ejects the envelope E toward the envelope ejection tray 134. The envelope ejection tray 134 is a tray on which the ejected envelope E is stacked.

The envelope ejection switching plate 31 pivots between two positions. The one position is a position at which the envelope E is conveyed from the flap opening roller pair 124 to the third vertical conveying roller pair 131 in the enclosure conveyance path 1104. The other position is a position at which the envelope E is conveyed from the enclosure conveyance path 1104 to the envelope ejection path 1108. The envelope ejection switching plate 31 is a member that rotates between these two positions to switch the conveyance direction of the envelope E.

As described above, the conveyance paths that convey the folded sheet Sf from the enclosure conveying device 110 to the enclosing device 120 and the sealing device 130 are disposed in connection with each other in the vertical direction (Z direction) in the envelope processing apparatus 100. The connected conveyance paths, which serve as both a conveyance path for the folded sheet Sf and a conveyance path for the envelope E, correspond to a vertical conveyance path in which the envelope conveyance path 1105 of the enclosing device 120 and the sealing conveyance path 1106 of the sealing device 130 are connected in the vertical direction (Z direction).

A description is given below of a series of steps of an enclosing-and-sealing process.

A series of steps of an enclosing operation and a sealing operation in the envelope processing apparatus 100 according to an embodiment of the present disclosure is described with reference to FIGS. 4 to 16. A combination of the enclosing operation and the sealing operation described below is referred to as an enclosing-and-sealing process. When the enclosing operation is performed, a control process executed by the envelope processing controller 150 is referred to as an enclosing process. Similarly, when the sealing operation is performed, a control process executed by the envelope processing controller 150 is referred to as a sealing process. The enclosing process and the sealing process are collectively referred to as an enclosing-and-sealing process. In the drawings described below, reference codes may be added only to components and configurations used for description of each operation step.

Figure 4:
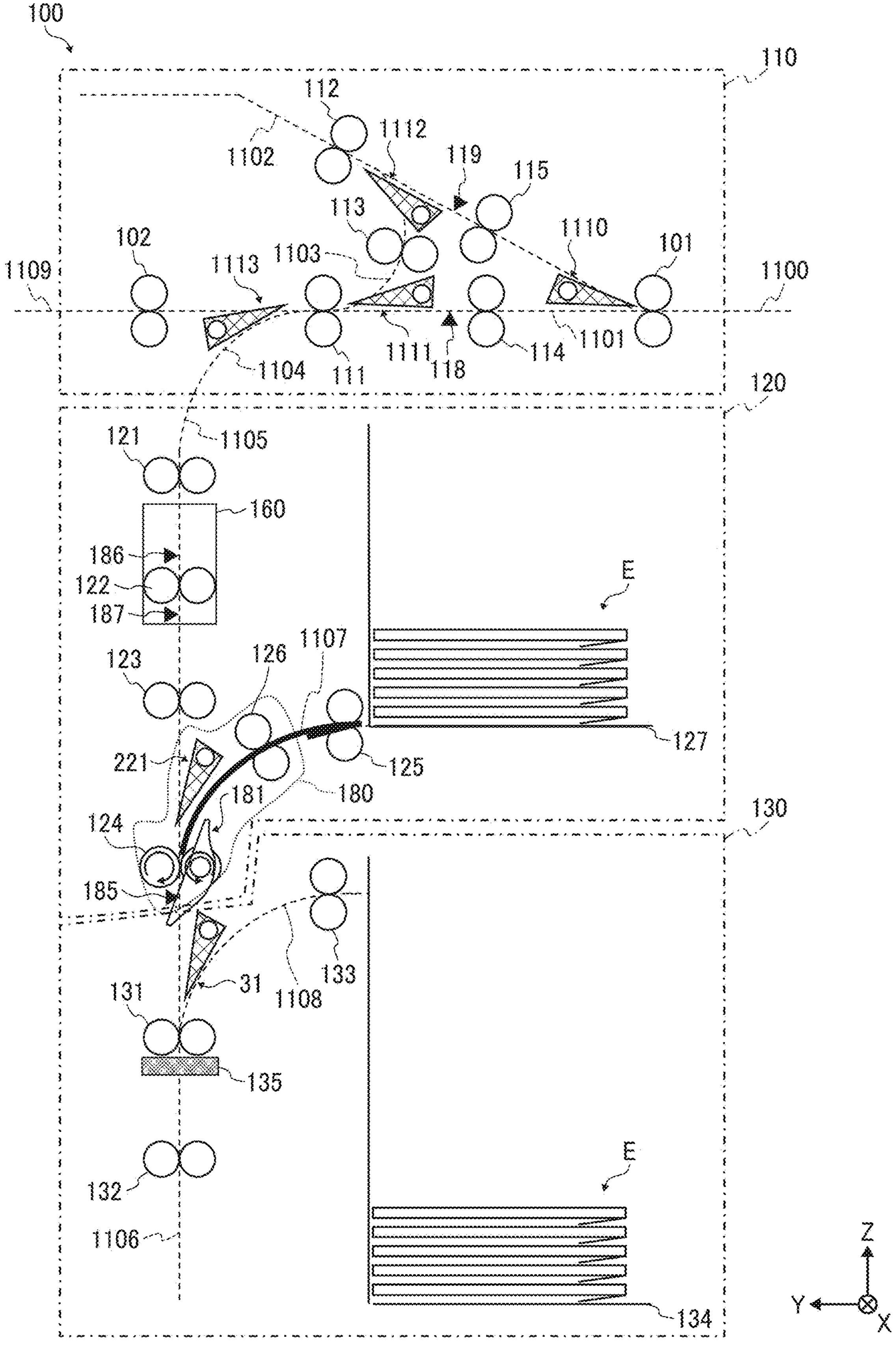
FIG. 4 is a cross-sectional view of the envelope processing apparatus, illustrating one step of an enclosing operation performed by the envelope processing apparatus, according to an embodiment of the present disclosure.

First, as illustrated in FIG. 4, the separation roller pair 125 rotates to separate and pick up one envelope E from multiple envelopes E stacked on the envelope load tray 127, and feeds the envelope E to the envelope entry path 1107. The envelope E fed from the envelope load tray 127 is conveyed to the flap opening roller pair 124 by the envelope conveying roller pair 126 disposed on the envelope entry path 1107.

When the envelope E is conveyed through the envelope entry path 1107, as illustrated in FIG. 4, the envelope switchback switching plate 221 is directed such that the envelope E can be conveyed from the envelope entry path 1107 to the envelope conveyance path 1105. As illustrated in FIG. 4, the envelope ejection switching plate 31 is oriented in a direction in which the envelope E can enter the sealing conveyance path 1106 from the envelope conveyance path 1105.

The flap opening roller pair 124, the third vertical conveying roller pair 131, and the fourth vertical conveying roller pair 132 rotate in a direction in which the envelope E is conveyed in the −Z direction. Accordingly, the envelope E is conveyed from the envelope entry path 1107 to the envelope conveyance path 1105.

Figure 5:
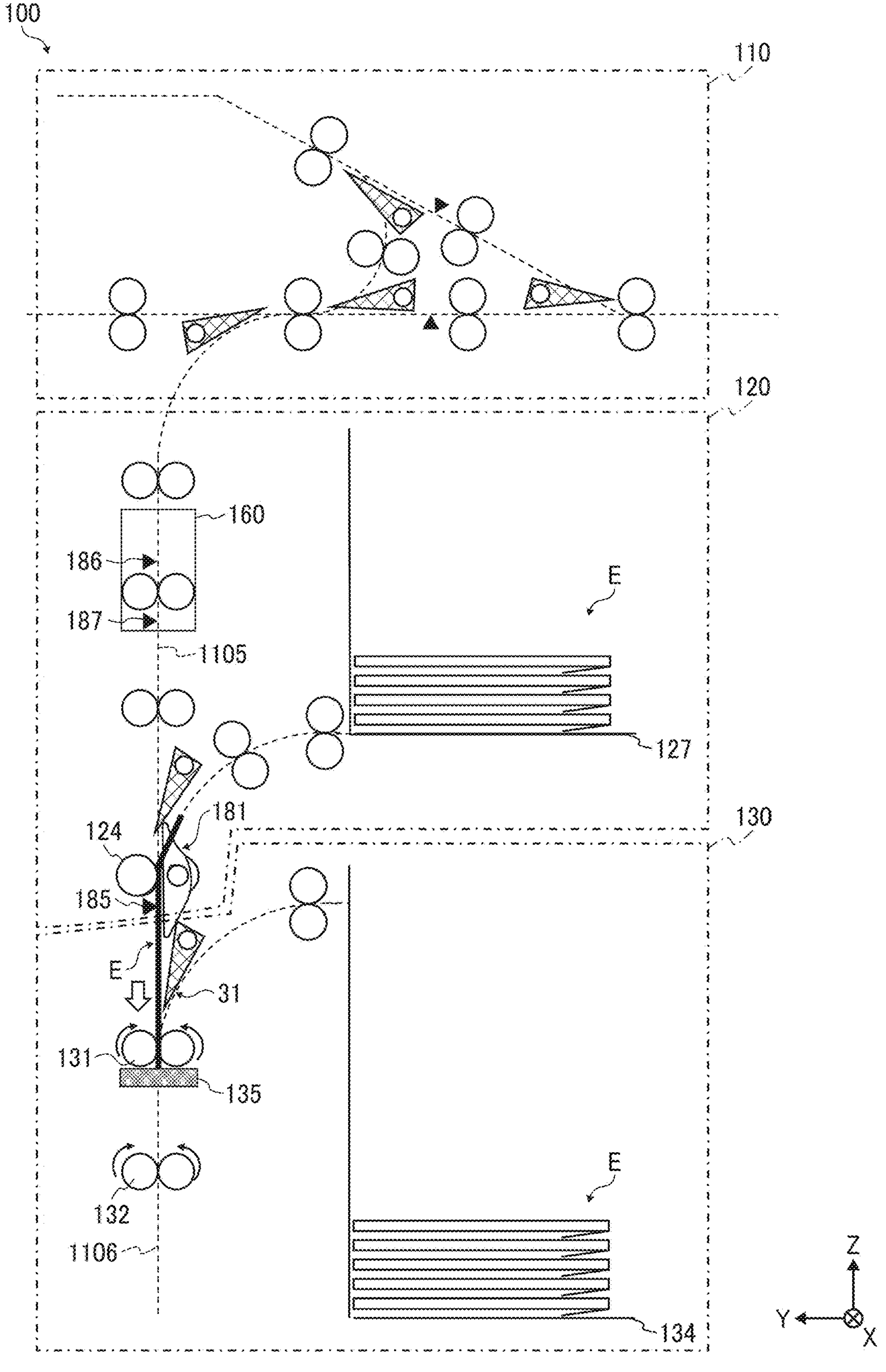
FIG. 5 is a cross-sectional view of the envelope processing apparatus, illustrating one step of an enclosing operation performed by the envelope processing apparatus, subsequent to FIG. 4.

Subsequently, as illustrated in FIG. 5, when the envelope E passes the flap opening roller pair 124, the flap ef is opened by the flap opening plate 181. The flap opening roller pair 124, the third vertical conveying roller pair 131, and the fourth vertical conveying roller pair 132 continue to rotate. Furthermore, when the envelope E passes the position of the envelope sensor 185 after passing through the flap opening roller pair 124, the detection signal of the envelope sensor 185 changes over time on the basis of a change in the thickness of the envelope E in the conveyance direction.

Figure 6:
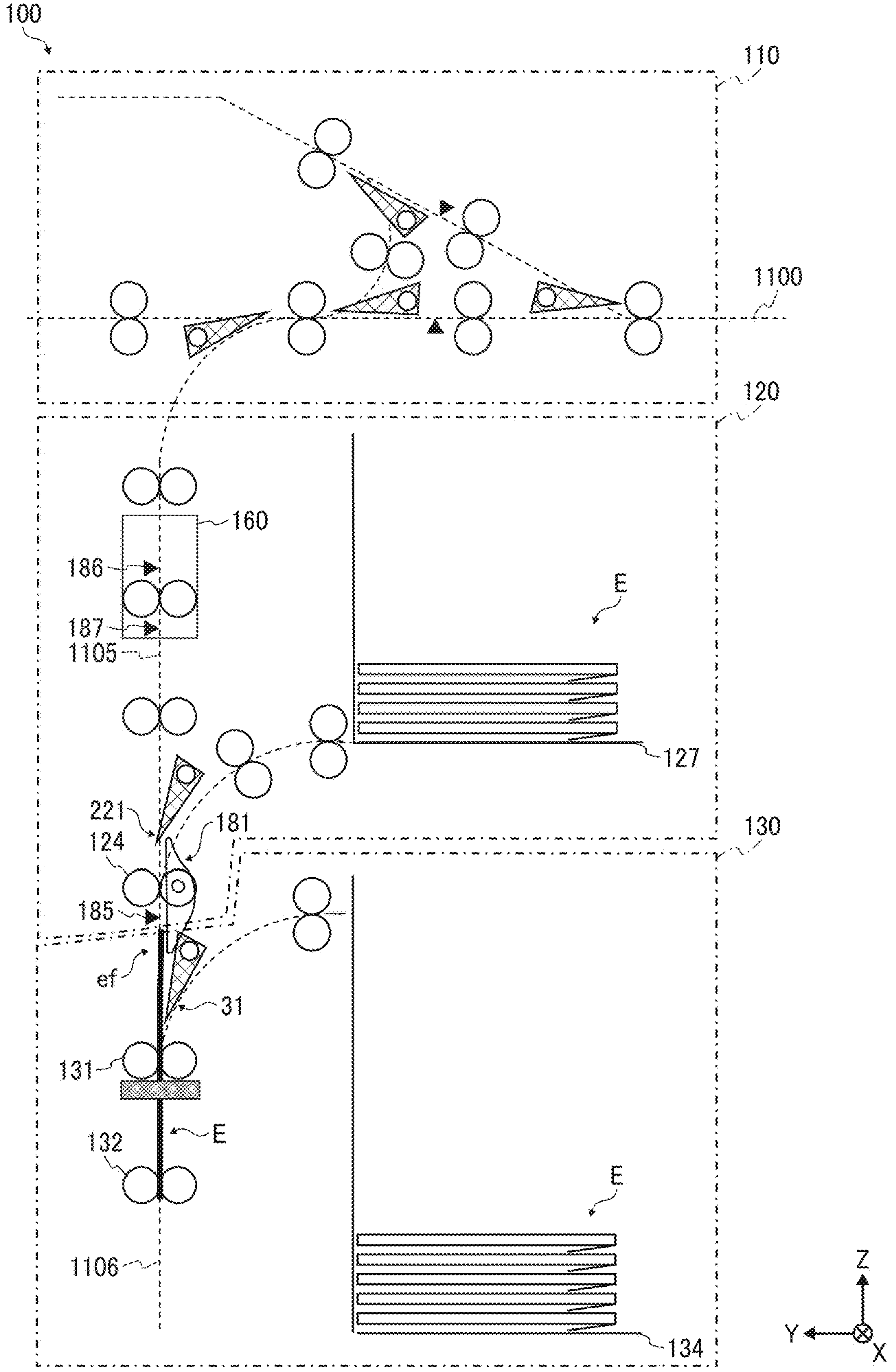
FIG. 6 is a cross-sectional view of the envelope processing apparatus, illustrating one step of an enclosing operation performed by the envelope processing apparatus, subsequent to FIG. 5.

Then, as illustrated in FIG. 6, when an end of the opened flap ef passes the envelope sensor 185, the rotation of the flap opening roller pair 124, the third vertical conveying roller pair 131, and the fourth vertical conveying roller pair 132 is temporarily stopped. After the flap opening roller pair 124, the third vertical conveying roller pair 131, and the fourth vertical conveying roller pair 132 are temporarily stopped, the envelope E is shifted so as to be conveyed in a switchback manner in the envelope conveyance path 1105.

Figure 7:
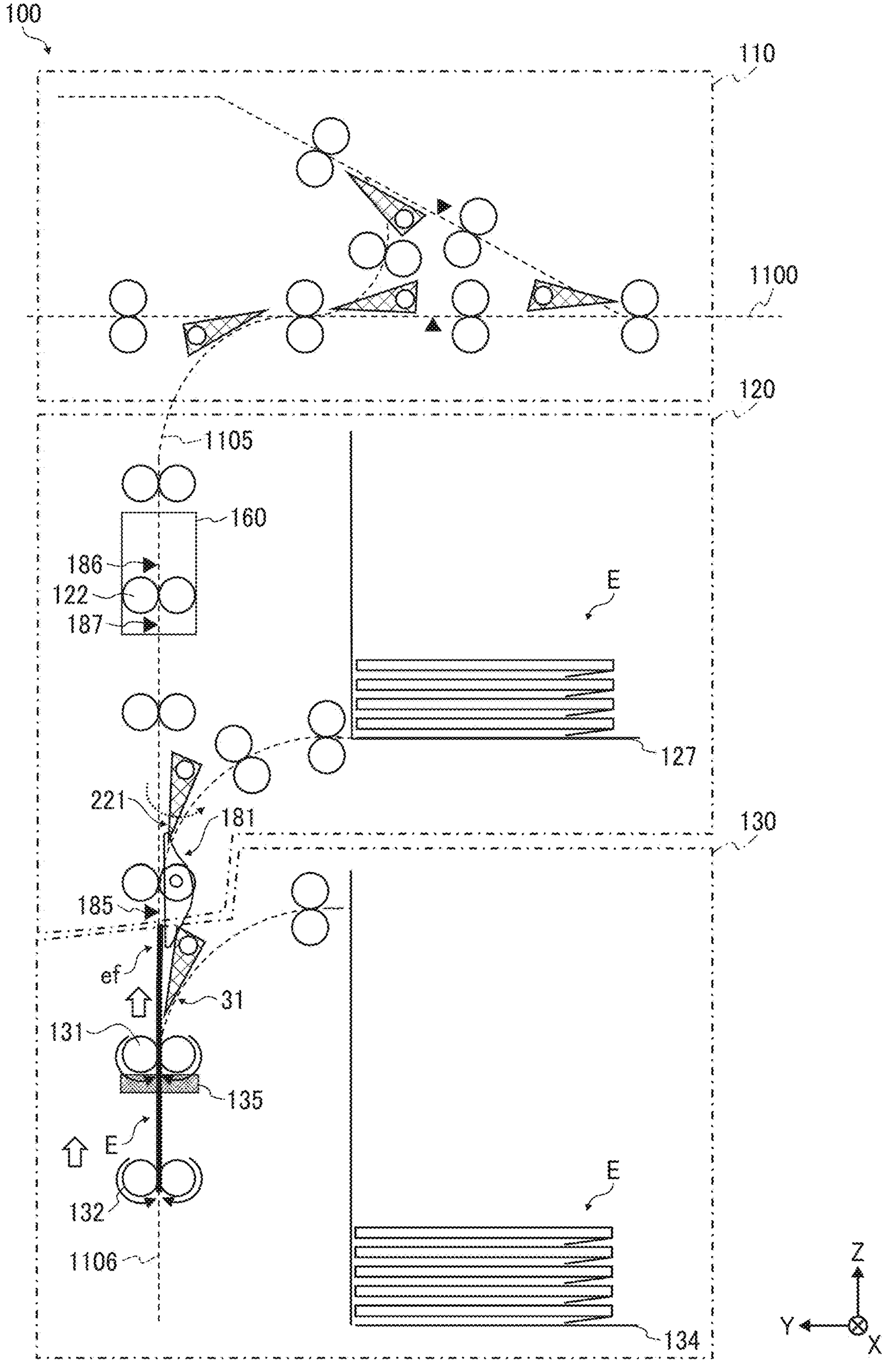
FIG. 7 is a cross-sectional view of the envelope processing apparatus, illustrating one step of an enclosing operation performed by the envelope processing apparatus, subsequent to FIG. 6.

Subsequent to the state of FIG. 6, as illustrated in FIG. 7, after the flap ef of the envelope E is opened and reaches a position where the flap ef has passed the flap opening roller pair 124, the third vertical conveying roller pair 131 and the fourth vertical conveying roller pair 132 are rotated in reverse. Thus, the envelope E is conveyed in the +Z direction in the sealing conveyance path 1106 and the envelope conveyance path 1105.

This conveyance is referred to as "switchback conveyance". The envelope switchback switching plate 221 rotates in the direction indicated by a broken arrow in FIG. 7 and moves from the position at which the tip of the envelope switchback switching plate 221 straddles the envelope conveyance path 1105, before switchback conveyance of the envelope E starts or simultaneously with the start of switchback conveyance. Thus, the envelope E turns into the state in which the envelope E can be conveyed upward in the envelope conveyance path 1105. As a result, the envelope E is conveyed to the enclosing position of the enclosing device 120 by switchback conveyance.

Figure 8:
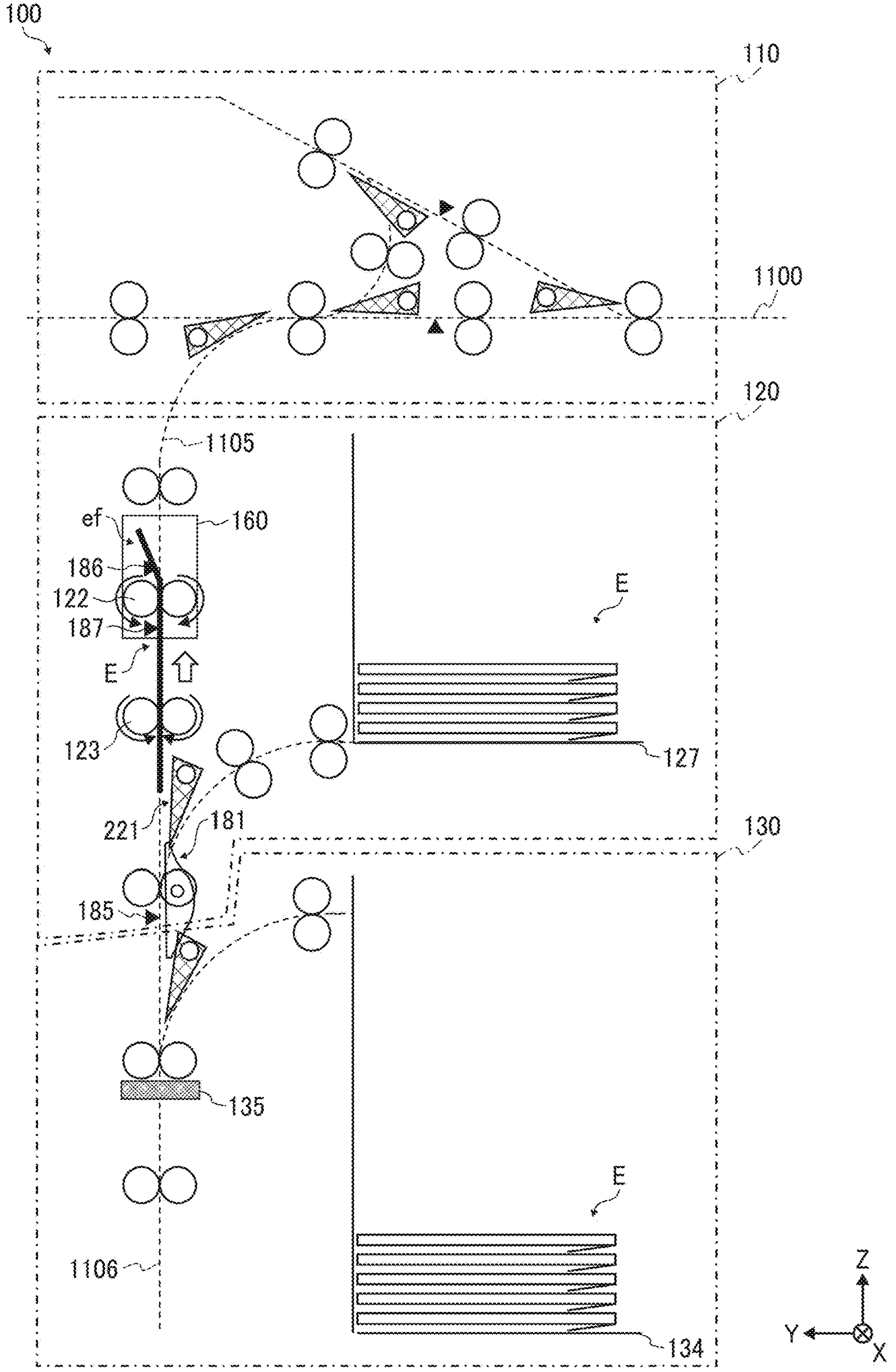
FIG. 8 is a cross-sectional view of the envelope processing apparatus, illustrating one step of an enclosing operation performed by the envelope processing apparatus, subsequent to FIG. 7.

Subsequently, as illustrated in FIG. 8, the envelope E is conveyed by the second vertical conveying roller pair 123 and the first vertical conveying roller pair 122 until the envelope E reaches the enclosing position corresponding to the flap length. When the flap ef has reached the enclosing position, corresponding to the flap length, where the flap ef passes out the first vertical conveying roller pair 122, the second vertical conveying roller pair 123 and the first vertical conveying roller pair 122 stops rotating and turns into an enclosing standby operation.

In the control of conveying the envelope E to the position for entering the enclosing standby operation, the conveyance amount of the envelope E may be calculated from a rotation amount of each conveyance roller after the separation roller pair 125 picks up the envelope E. The position of the envelope E in the envelope conveyance path 1105 may be determined based on the conveyance amount and the length of the conveyance path.

Subsequently, a description is given of an operation of conveying an enclosure to the enclosing position. The operation of conveying an enclosure to the enclosing position may be executed in parallel with (at the same time as) the operation of conveying the envelope E described with reference to FIGS. 3 to 8. In the present embodiment, for example, as illustrated in FIG. 9, the envelope processing apparatus 100 receives a folded sheet Sf from an upstream apparatus (e.g., the folding apparatus 300) at an entrance roller pair 101 and conveys the folded sheet Sf to the first conveyance path 1101 in a state where the envelope E is on standby for enclosing at the enclosing position.

Figure 10:
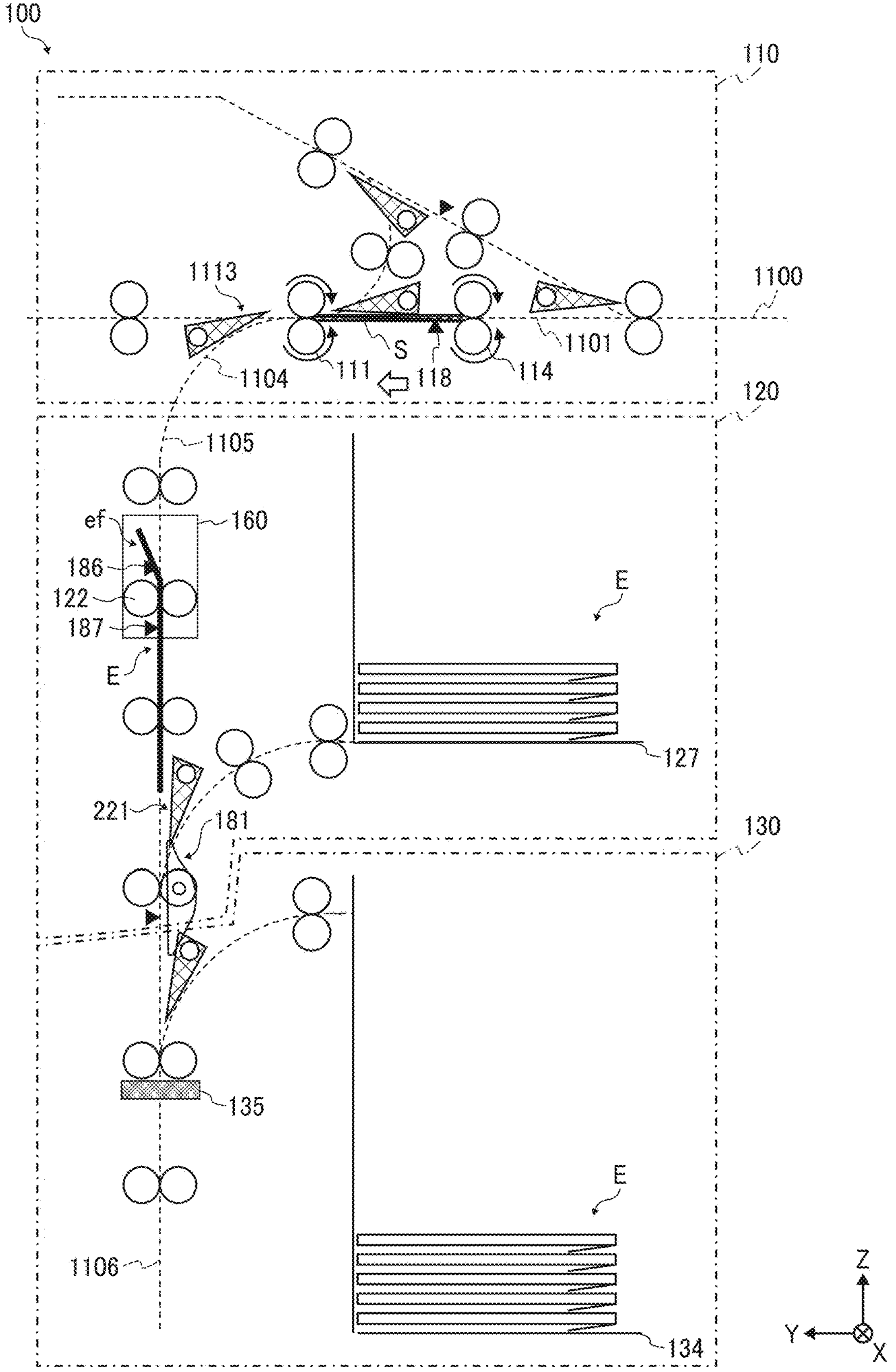
FIG. 10 is a cross-sectional view of the envelope processing apparatus, illustrating one step of an enclosing operation performed by the envelope processing apparatus, subsequent to FIG. 9.
Figure 11:
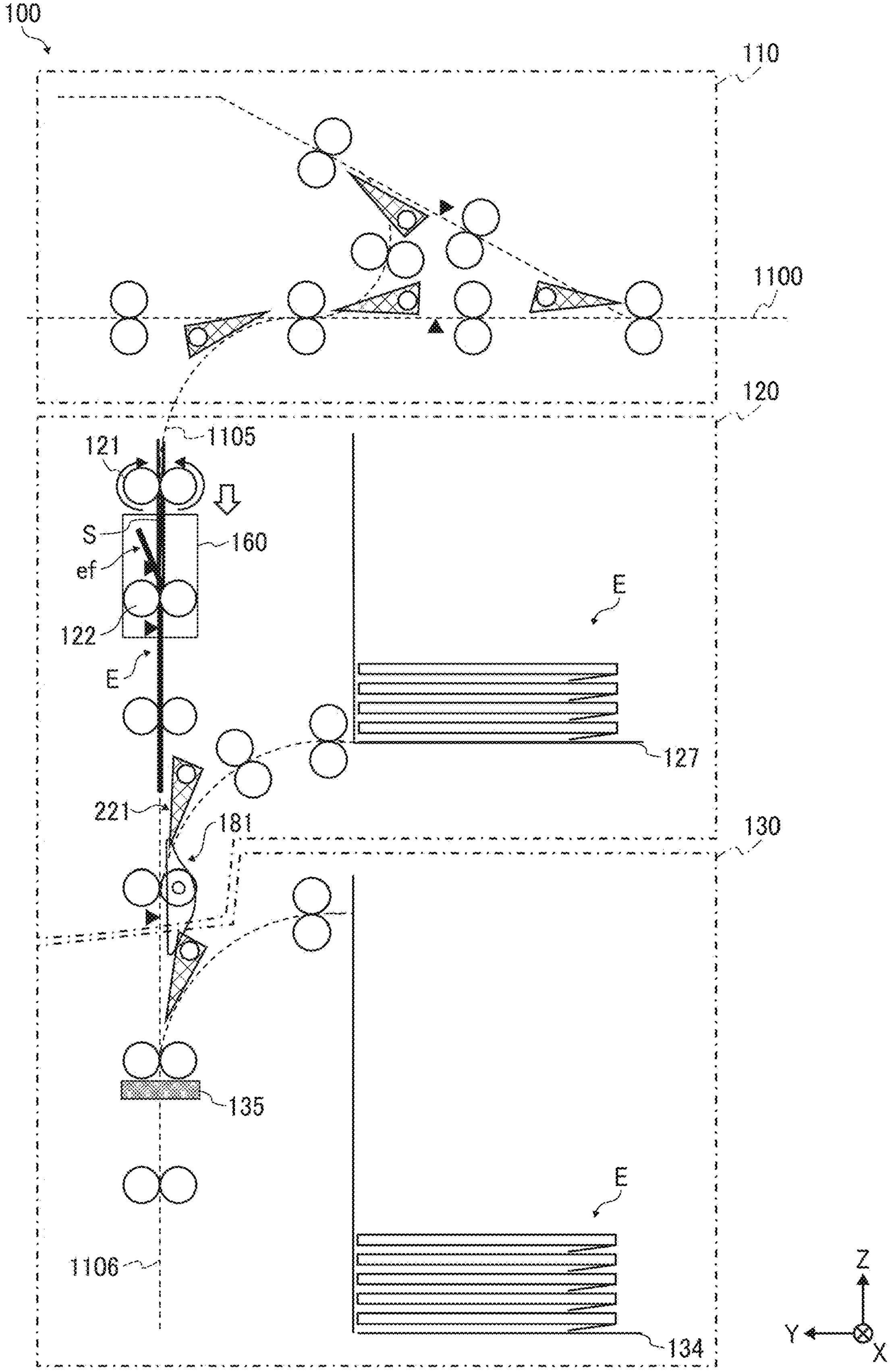
FIG. 11 is a cross-sectional view of the envelope processing apparatus, illustrating one step of an enclosing operation performed by the envelope processing apparatus, subsequent to FIG. 10.

Subsequently, as illustrated in FIG. 10, a first intermediate conveying roller pair 114 and a first conveying roller pair 111 convey the folded sheet Sf downstream in the conveyance direction. At this time, the first switching plate 1111 and the third switching plate 1113 are positioned as illustrated in FIG. 11. The folded sheet Sf is conveyed from the first conveyance path 1101 to the enclosure conveyance path 1104.

Then, as illustrated in FIG. 11, the enclosing roller pair 121 conveys the folded sheet Sf, which is conveyed from the enclosure conveyance path 1104 to the envelope conveyance path 1105, further in the −Z direction. As a result, the folded sheet Sf is enclosed into the envelope E that is held in the enclosing standby state at the specified enclosing position in the envelope conveyance path 1105 by, for example, the first vertical conveying roller pair 122.

Figure 9:
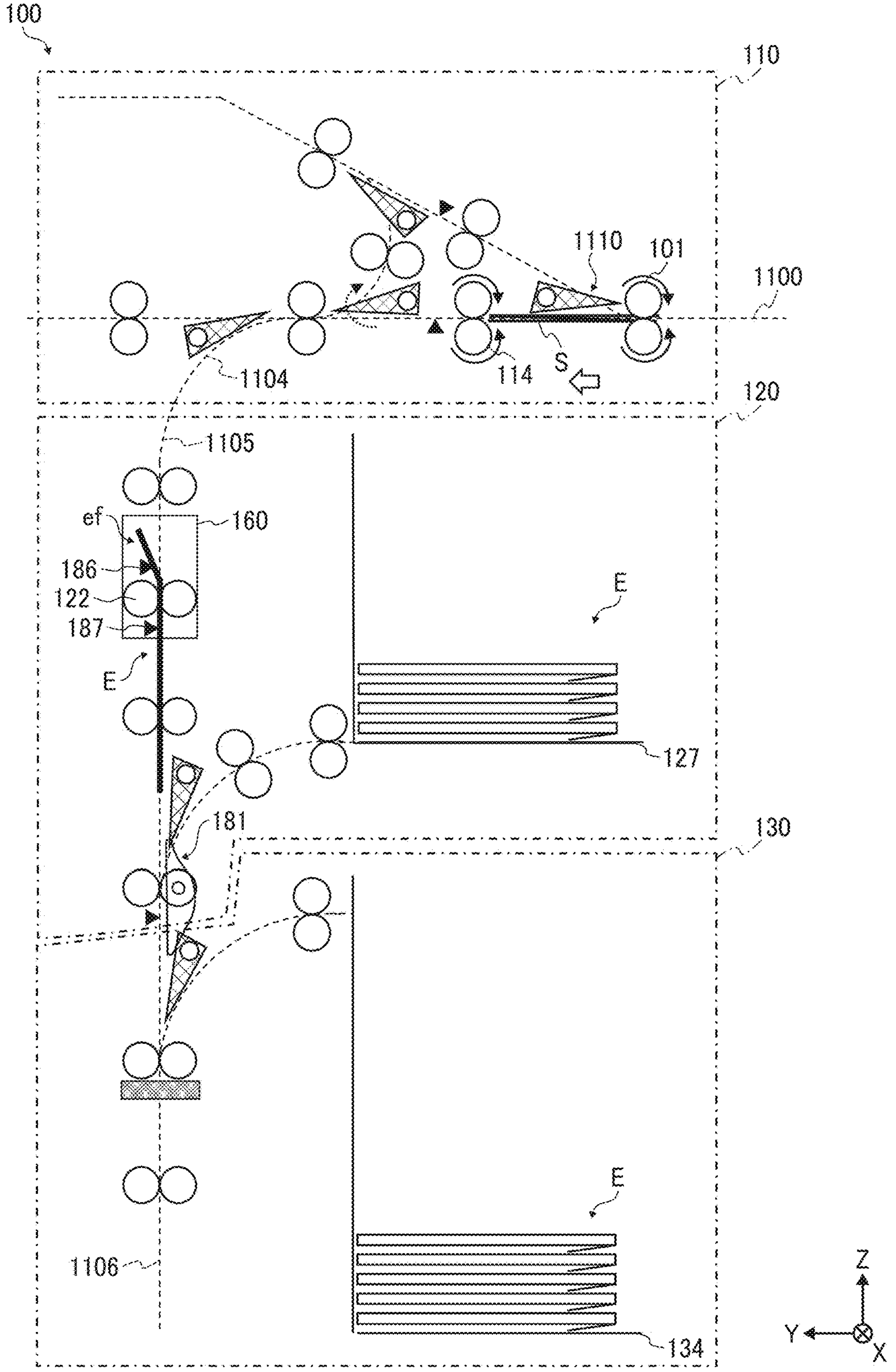
FIG. 9 is a cross-sectional view of the envelope processing apparatus, illustrating one step of an enclosing operation performed by the envelope processing apparatus, subsequent to FIG. 8.

While the control processes are performed in the states illustrated in FIGS. 9 to 11, a control process for adjusting the position of the envelope E in the width direction is performed in the enclosing support 160 of the enclosing device 120.

As described above, the enclosing operation is performed to insert the enclosure into the envelope E. The sealing operation is executed subsequently.

Figure 12:
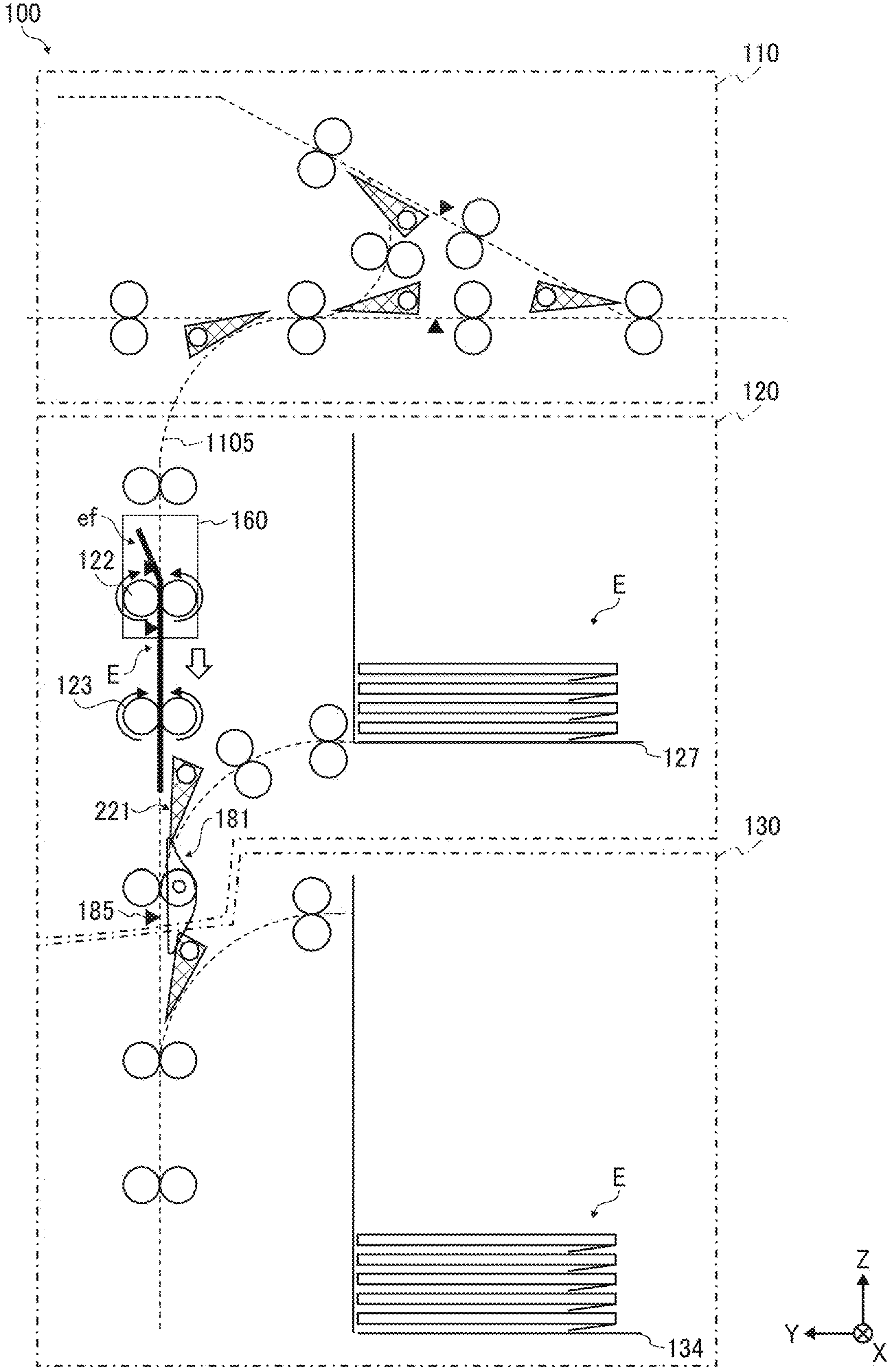
FIG. 12 is a cross-sectional view of the envelope processing apparatus, illustrating one step of an enclosing operation performed by the envelope processing apparatus, subsequent to FIG. 11.
Figure 13:
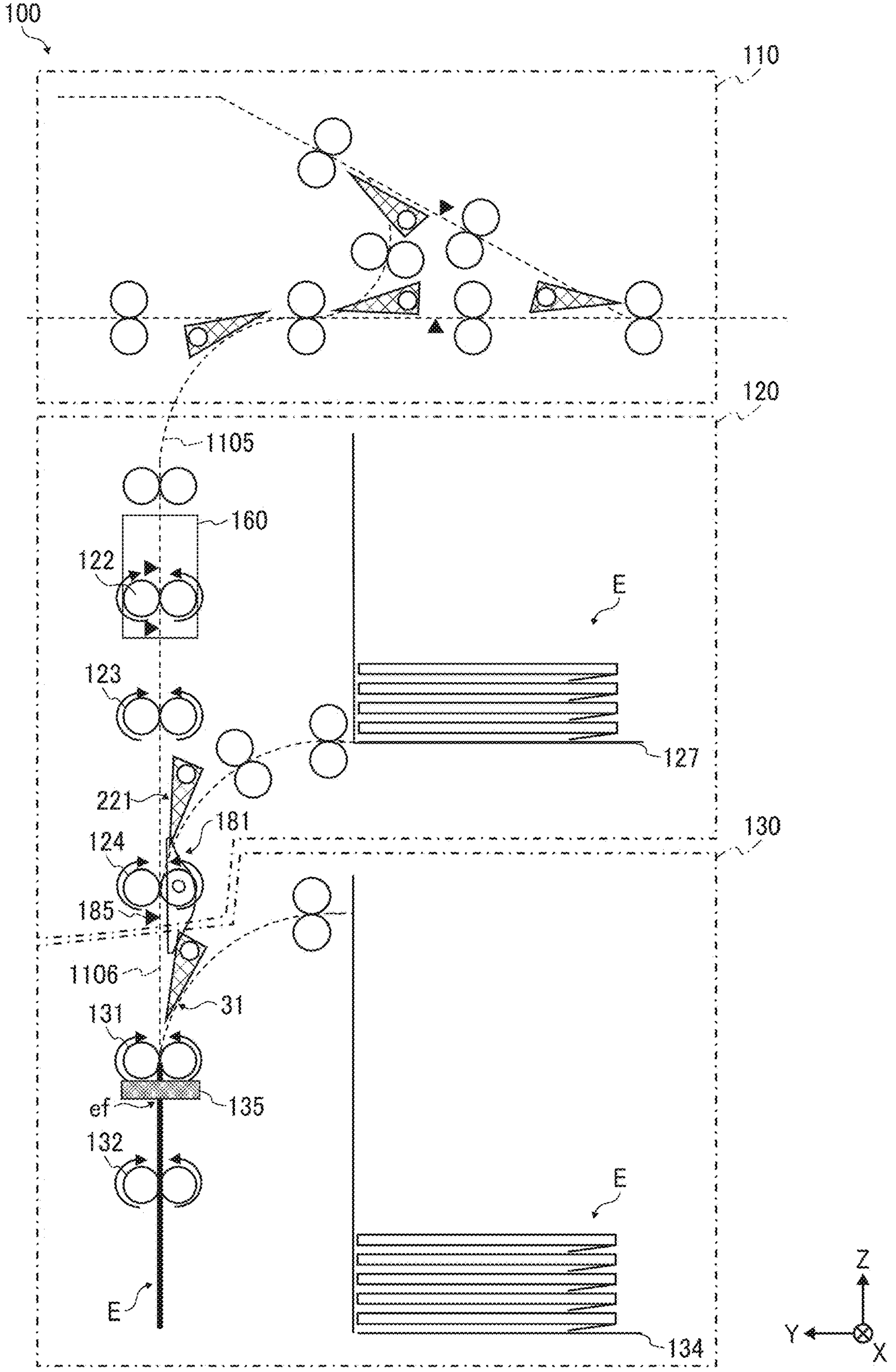
FIG. 13 is a cross-sectional view of the envelope processing apparatus, illustrating one step of an enclosing operation performed by the envelope processing apparatus, subsequent to FIG. 12.

As illustrated in FIG. 12, the first vertical conveying roller pair 122 and the second vertical conveying roller pair 123 are rotated to convey the envelope E downward. As illustrated in FIG. 13, the envelope E is conveyed to the fourth vertical conveying roller pair 132. The envelope E with the folded sheet Sf enclosed is conveyed to a position at which the flap ef is past the envelope ejection switching plate 31.

In the course of the operations from FIG. 12 to FIG. 13, the envelope E containing an enclosure passes the envelope sensor 185. When the envelope E passes, the envelope sensor 185 also acquires the transparent-portion information indicating the position of the transparent window ew in the envelope E. It is determined whether the image area of the envelope E specified by the transparent-portion information includes specific information such as address information. If the specific information is included in the image area, it can be determined that the enclosing process has been appropriately performed. When the specific information is not included in the image area, it can be determined that the enclosing process has not been appropriately performed. When the enclosing process has not been appropriately performed, the envelope E is conveyed to the envelope ejection tray 134, and the user is notified of the abnormality via a notification device 190.

Figure 14:
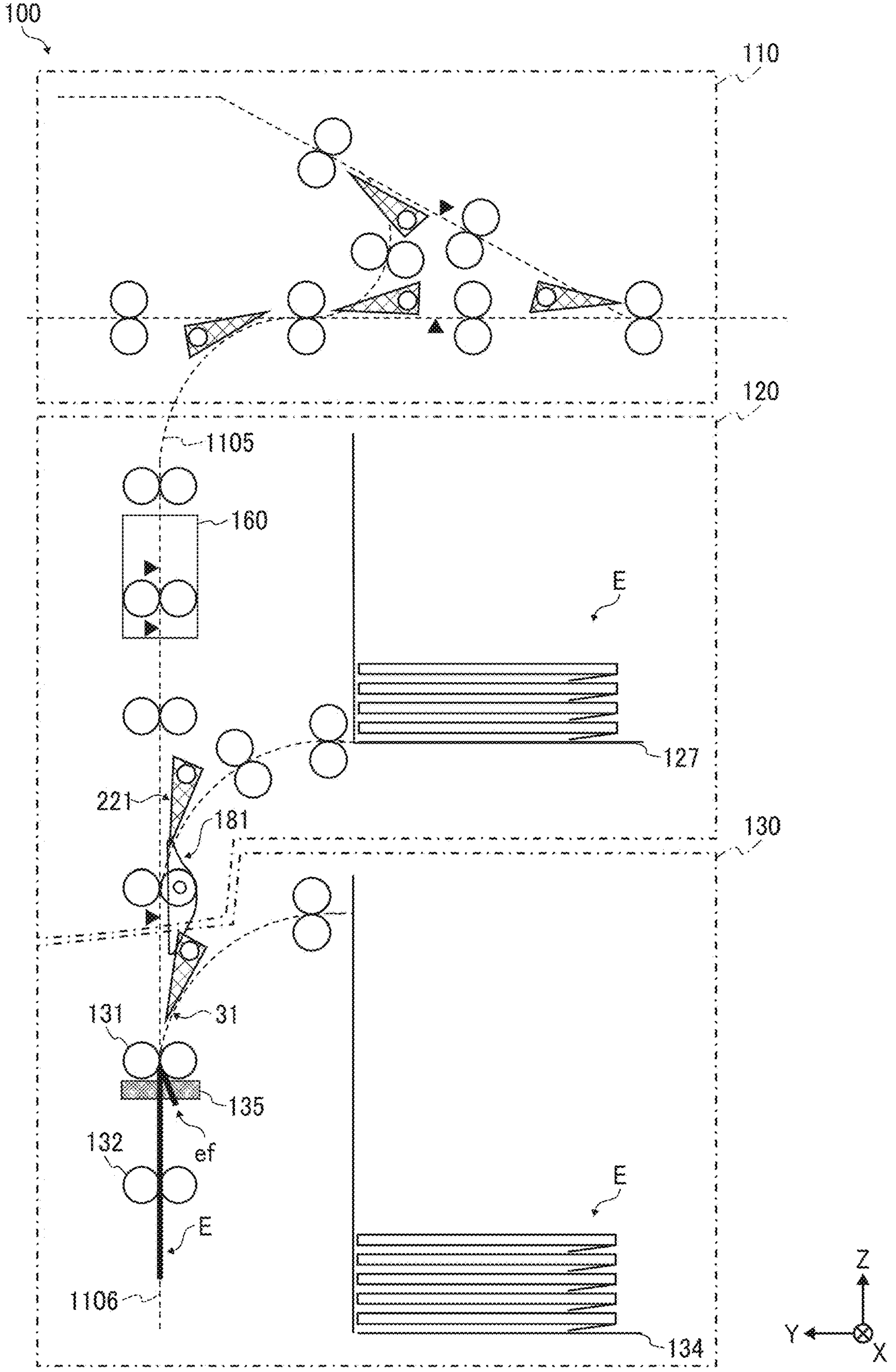
FIG. 14 is a cross-sectional view of the envelope processing apparatus, illustrating one step of an enclosing operation performed by the envelope processing apparatus, subsequent to FIG. 13.

When the sealing process has been appropriately performed, as illustrated in FIG. 14 subsequent to the state of FIG. 13, the sealer 135 closes the flap ef between the third vertical conveying roller pair 131 and the fourth vertical conveying roller pair 132 to seal the envelope E.

Figure 15:
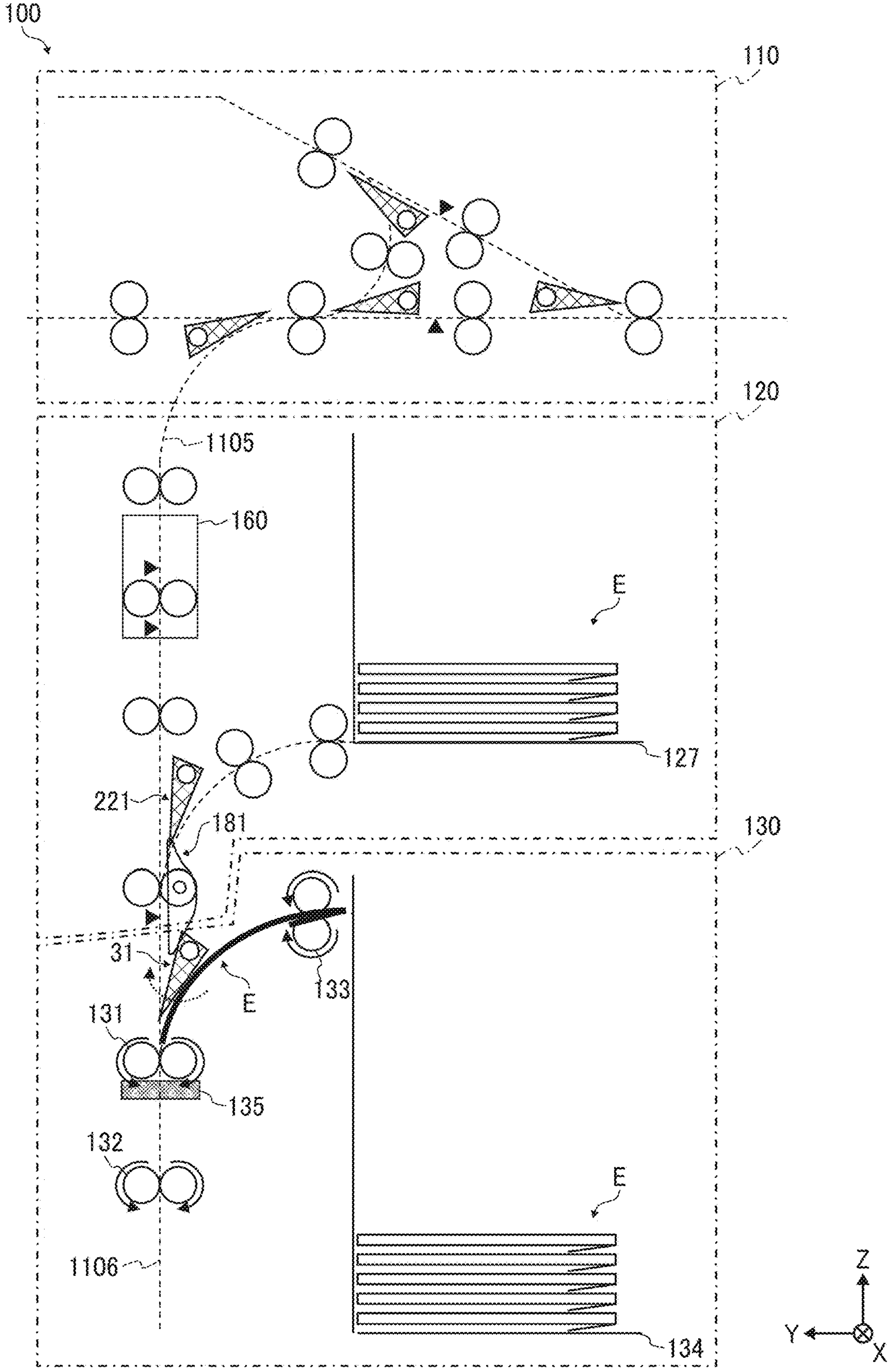
FIG. 15 is a cross-sectional view of the envelope processing apparatus, illustrating one step of an enclosing operation performed by the envelope processing apparatus, subsequent to FIG. 14.

As illustrated in FIG. 15, the third vertical conveying roller pair 131 and the fourth vertical conveying roller pair 132 rotate in reverse to switch back and convey the sealed envelope E. Before the third vertical conveying roller pair 131 and the fourth vertical conveying roller pair 132 rotate in reverse, the envelope ejection switching plate 31 rotates into the state illustrated in FIG. 23. Thus, the third vertical conveying roller pair 131 and the fourth vertical conveying roller pair 132 convey the envelope E with the folded sheet Sf enclosed, from the enclosure conveyance path 1104 to the envelope ejection path 1108.

Figure 16:
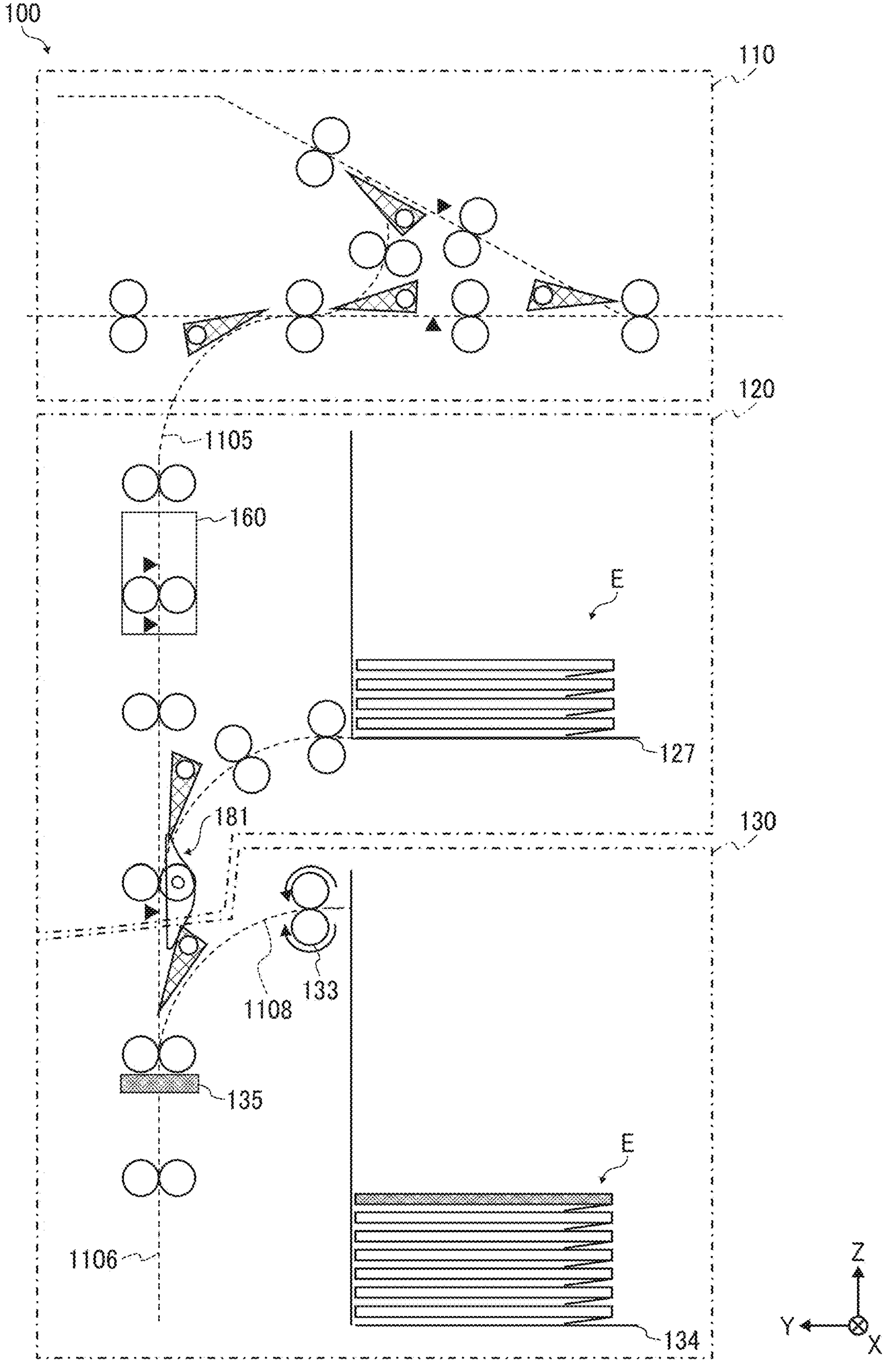
FIG. 16 is a cross-sectional view of the envelope processing apparatus, illustrating one step of an enclosing operation performed by the envelope processing apparatus, subsequent to FIG. 15.

As a result, as illustrated in FIG. 16, the envelope ejection roller pair 133 ejects the sealed envelope E onto the envelope ejection tray 134. As described above, the envelope E containing the enclosure is sealed and reaches the envelope ejection tray 134, and the enclosing and sealing operation is completed.

The details of the enclosing support 160 are described below.

Figure 17:
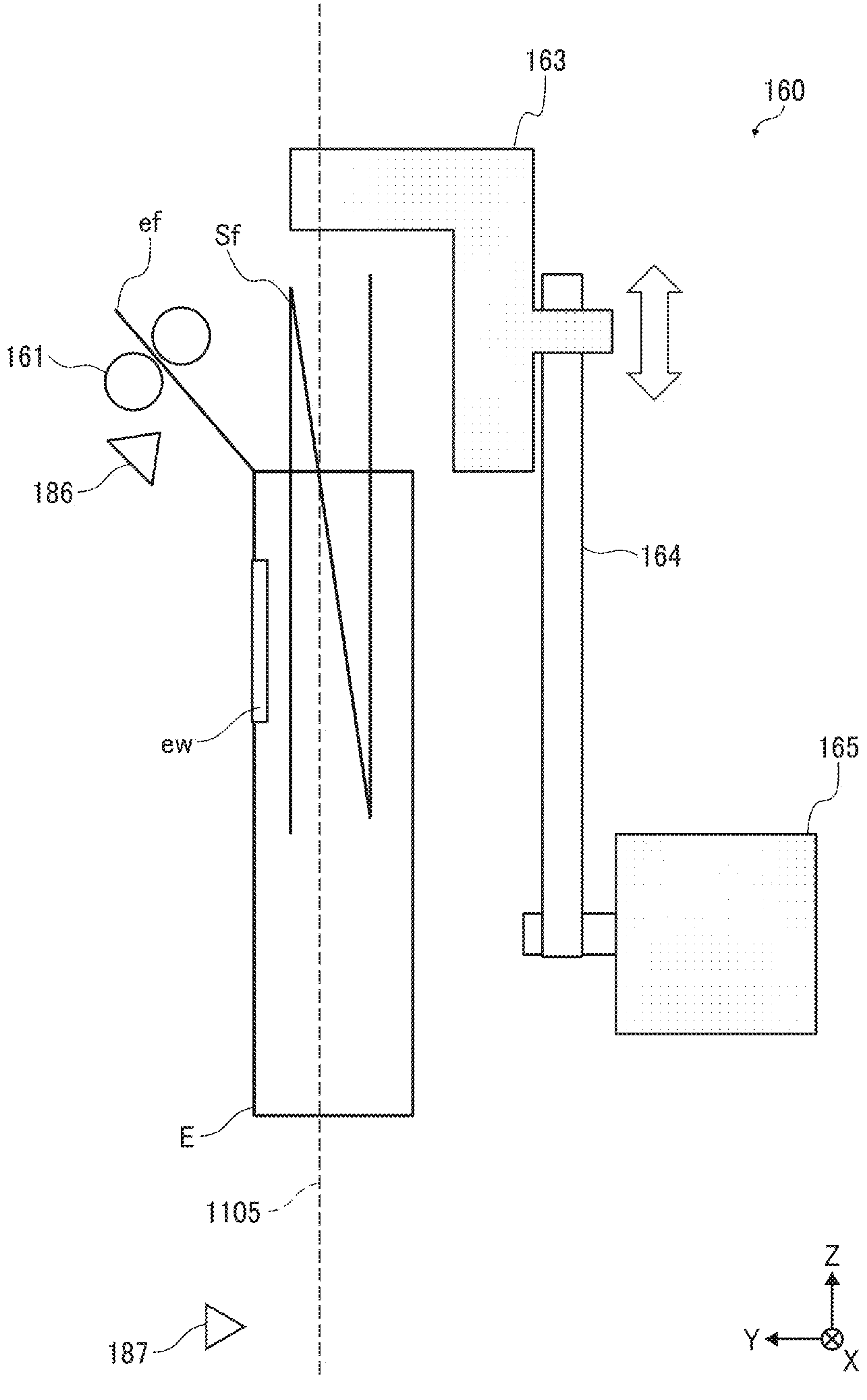
FIG. 17 is a diagram illustrating a configuration of an enclosing support according to an embodiment of the present disclosure.

A configuration of the enclosing support 160 is described with reference to FIG. 17. The enclosing support 160 includes a flap holding roller pair 161 for holding the flap ef of the envelope E in an open state, a flap detection sensor 186 for detecting whether the flap ef has been appropriately held by the flap holding roller pair 161, and a conveyance sensor 187 for detecting that the envelope E, after being enclosed, has been appropriately conveyed in the ejection direction.

The enclosing support 160 includes a pushing plate 163, a lifting belt 164, and a lifting motor 165. When the lifting motor 165 is driven to rotate the lifting belt 164, the pushing plate 163 moves in the Z direction. The pushing plate 163 pushes an end of the enclosure toward the envelope E, so that the enclosure (the folded sheet Sf) is inserted into the envelope E.

The flap holding roller pair 161 is movable in the X direction while holding the flap ef. This movement of the flap holding roller pair 161 allows adjustment of the position of the envelope E in the X direction (the position of the envelope E in the width direction). This position adjustment allows adjustment of the relative positional relationship between the position of the information (specific information) formed in part of the folded sheet Sf and indicating an address or the like and the position of the transparent window ew. This adjustment allows the specific information to be visually recognized from the outside in the state where the folded sheet sf is placed in the envelope E.

Since the position adjustment in the width direction of the envelope E can be executed before the enclosure is enclosed, the enclosing process can be prevented from being waited for the position adjustment, thus allowing an increase in productivity.

A description is given below of details of the envelope E and the transparent window ew.

Specifically, an example of the transparent window ew that is part of the structure of the envelope E and corresponds to the transparent portion are described below. Some examples of envelope images obtained by the envelope sensor 185 capturing envelopes E being conveyed are illustrated in FIGS. 18A to 18D. As illustrated in FIGS. 18A to 18D, the envelopes E have a common shape, but the transparent windows ew have various shapes and dimensions.

The position, shape, and dimension of the transparent window ew are obtained by analyzing an envelope image. For example, a portion of the transparent window ew is specified in the envelope image, and the dimension of the transparent window ew can be calculated from the number of pixels forming the contour of the portion specified as the transparent window ew.

Figure 18A:
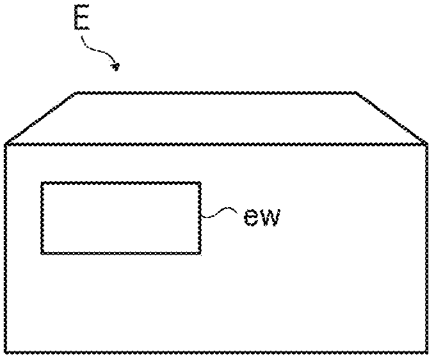
FIGS. 18A to 18D are diagrams each illustrating an outline of an envelope applicable to an envelope processing apparatus according to an embodiment of the present disclosure.
Figure 18B:
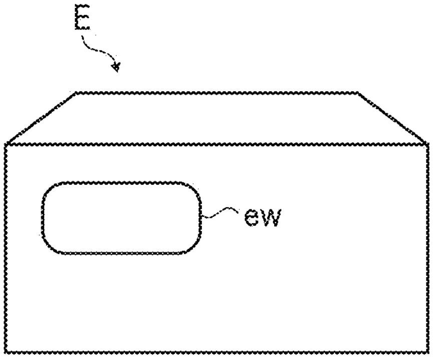
Figure 18C:
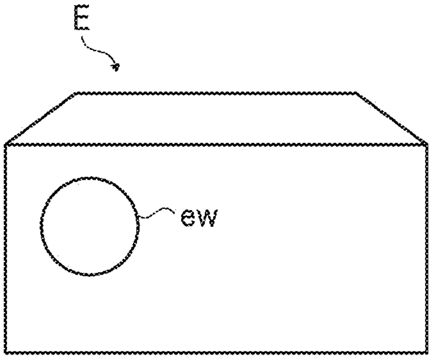
Figure 18D:
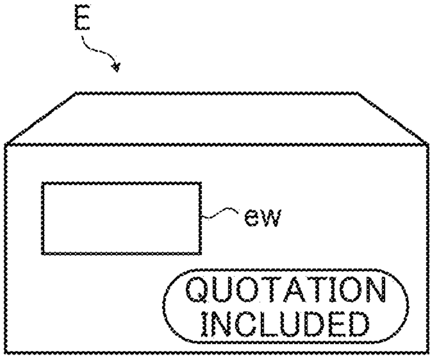

Furthermore, as illustrated in FIG. 18D, a planar image of the envelope E (envelope image) mat include not only the outline of the envelope E and the outline of the transparent window ew but also characters and graphics appended to the envelope E. To distinguish between the image of the transparent window ew and an image other than the image corresponding to the transparent window ew, a portion in which no other image (character or graphic) is included in the surrounded area may be determined as the transparent window ew.

The position of the transparent window ew is determined from the envelope information obtained via the envelope sensor 185, and thus the relative positional relationship between the transparent window ew and the specific information on the folded sheet sf as an enclosure can be determined. The determination result can be used to perform the position adjustment of the envelope E in the lateral direction (width direction).

A description is given below of the relative position of the transparent window ew and the specific Information.

Specifically, with reference to FIG. 19, a description is given of the adjustment of an enclosure in the conveyance direction, regarding the relative positional relationship between the position of the specific information (e.g., address) and the position of the transparent window ew when the folded sheet Sf is inserted into the envelope E. FIG. 9A is a diagram similar to FIG. 18A. While the envelope E is held by the flap holding roller pair 161, the flap holding roller pair 161 is shifted in the width direction of the envelope E, so that as in FIG. 19B, the relative positional relationship between the enclosure (folded sheet Sf) and the transparent window ew can be adjusted. The position of the specific information (e.g., address) is notified from the upstream apparatus (e.g., the printer controller 260). The printer controller 260 acquires the position information on the specific information from the target data (document file) of the image forming processing and via the scanning function.

Figure 19A:
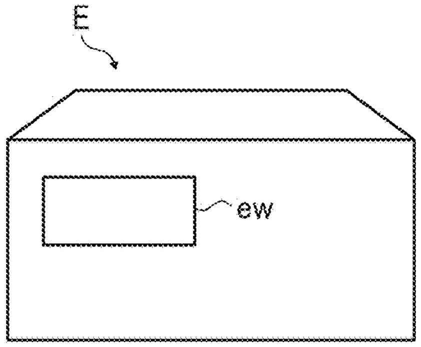
FIGS. 19A to 19D are diagrams each illustrating an outline of position adjustment processing in an enclosing process according to an embodiment of the present disclosure.
Figure 19B:
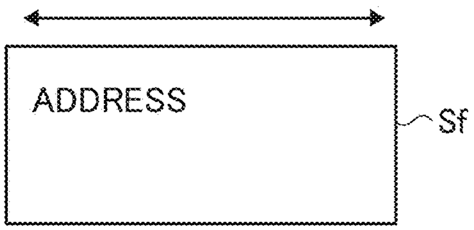
Figure 19C:
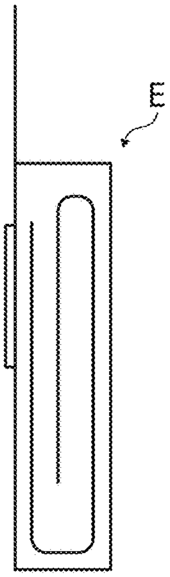
Figure 19D:
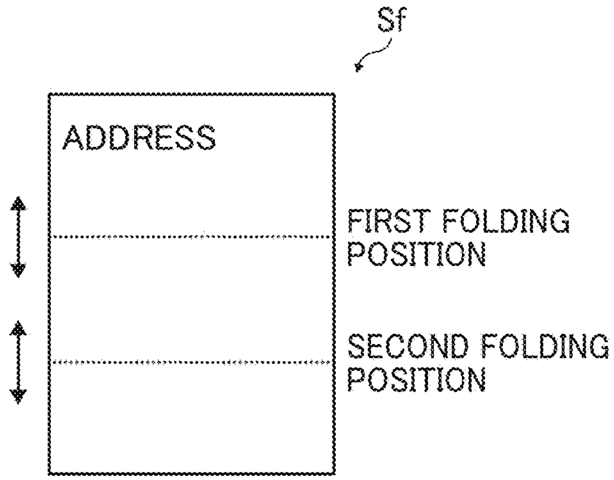

In addition, as illustrated in FIG. 19C, in order to adjust the position of the specific information on the folding sheet sf to the transparent window ew when the folding sheet sf is inserted into the envelope E, the positions of the fold lines may be adjusted as illustrated in FIG. 19D in the folding process performed in the folding apparatus 300.

For example, the position of the specific information is acquired from the data for forming the sheet S or by scanning the sheet S, and is notified to the envelope processing controller 150. The envelope processing controller 150 generates position adjustment information for adjusting the position of the specific information in the conveyance direction, based on the specific information and transparent-portion information indicating the position of the transparent window ew obtained by imaging during conveyance of the envelope E and notified to the envelope processing controller 150. The envelope processing controller 150 outputs the generated position adjustment information to the folding apparatus 300.

In the folding apparatus 300, the first folding position is adjusted and folding is performed so that the specific information matches the position of the transparent window ew, and then the second folding position is adjusted so that the middle and lower layers of the three-folding do not exceed the envelope length.

Figure 20:
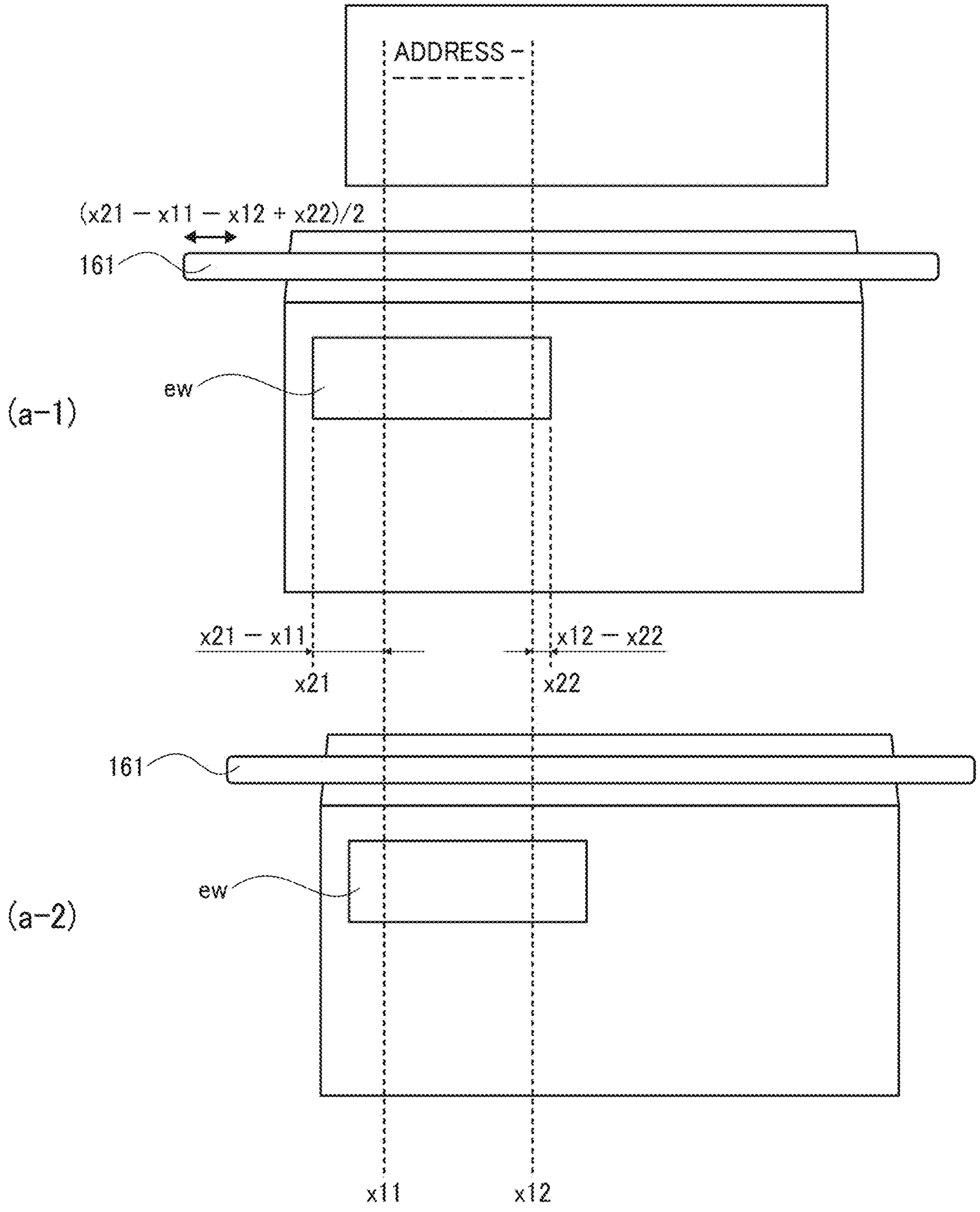
FIG. 20 is a diagram illustrating an outline of position adjustment processing and lateral shift processing according to an embodiment of the present disclosure.

A description is given below of an example of a shift operation for adjusting the relative positional relationship between the position of the enclosure inserted in the envelope E and the position of the transparent window ew, as illustrated in FIGS. 19A and 19B. FIG. 20 represents an example in which the address width and the address window width are adjusted to be equal.

The positions of ends of the envelope in the width direction are specified in the window position specified by analyzing the envelope image acquired by the envelope sensor 185. For example, one end is referred to as x21 and the other end is referred to as x22.

Further, the positions of ends of specific information in the width direction in the position at which the specific information is formed by the image forming process executed by the upstream apparatus are referred to as x11 and x12.

In this case, the amount of relative position deviation (displacement amount) between one end of the specific information in the width direction and the corresponding end of the window position in the width direction can be calculated by an expression of X21−X11. The amount of relative position deviation (displacement amount) between the other end of the specific information in the width direction and the corresponding end of the window position in the width direction can be calculated by an expression of X12−X22. This arithmetic processing is executed by the envelope processing controller 150, and information derived from the arithmetic result is notified to the folding controller 320 and the printer controller 260.

In the case of the example described above, in order to adjust the position of the envelope E in the width direction so that the amount of displacement in both end portions is uniform, the flap holding roller pair 161 may be moved in the width direction of the envelope E. The movement amount of the flap holding roller pair 161 can be calculated by an expression of (x21−x11−x12+x22)/2.

Figure 21:
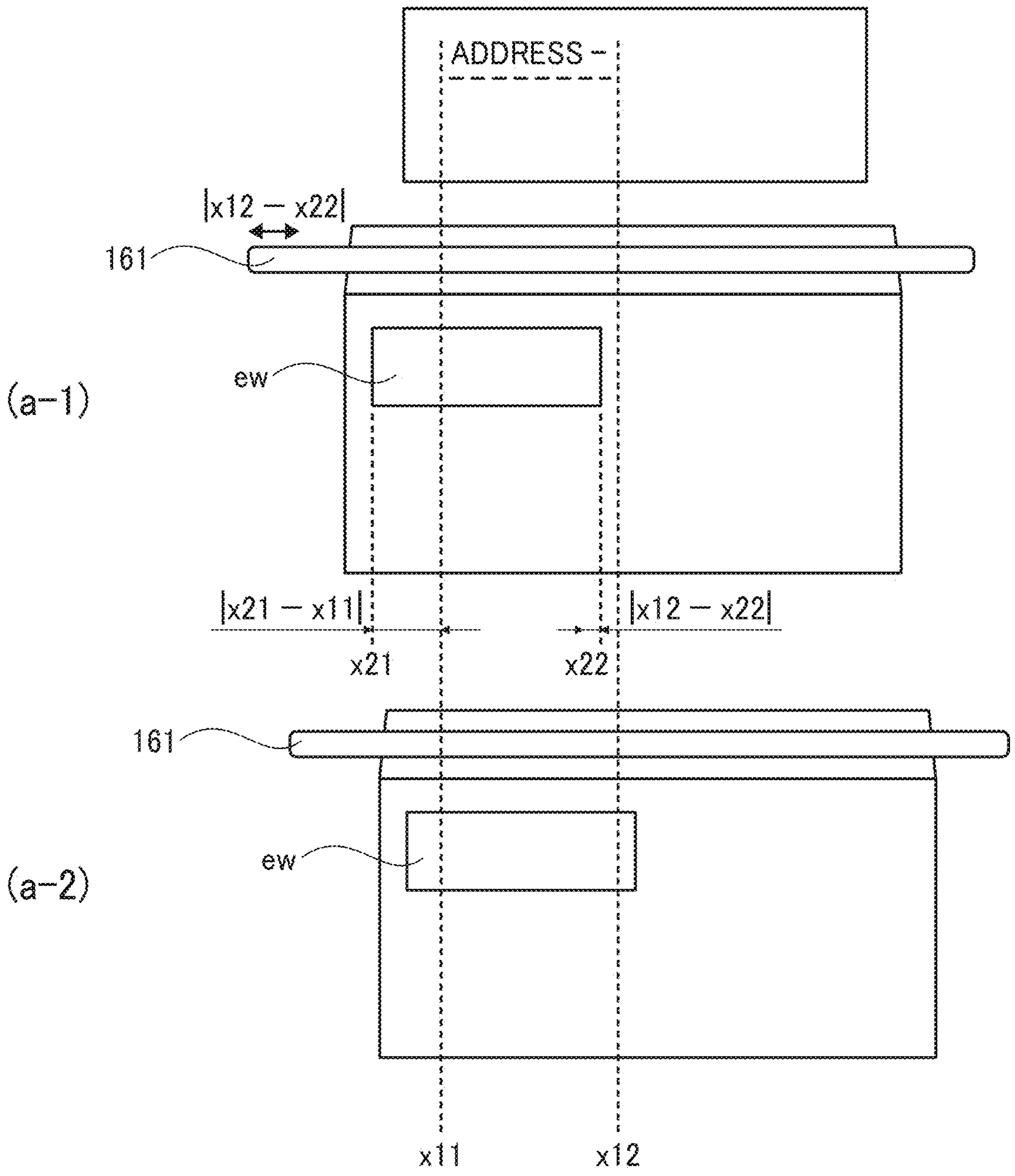
FIG. 21 is a diagram illustrating an outline of position adjustment processing and lateral shift processing according to an embodiment of the present disclosure.

FIG. 21 represents an example in which the width of address is shifted so as to be within the width of address window in a case where the width of address is not within the width of address window. Similarly with FIG. 20, the coordinates of the window position are denoted by x21 and x22, and the coordinates of ends of the specific information in the width direction are denoted by x11 and x12. Similarly to FIG. 20, when the expressions of x21−x11 and x12−x22 are calculated at the respective ends, the result may be a negative number.

In this case, the specific information does not fit in the transparent window ew, thus causing a state in which part of the specific information is not visible. For this reason, when the calculation result is a negative number, the envelope E is shifted by a distance equal to or more than the displacement amount. Thus, the specific information (address) can be adjusted to fall within the transparent window ew.

Figure 22:
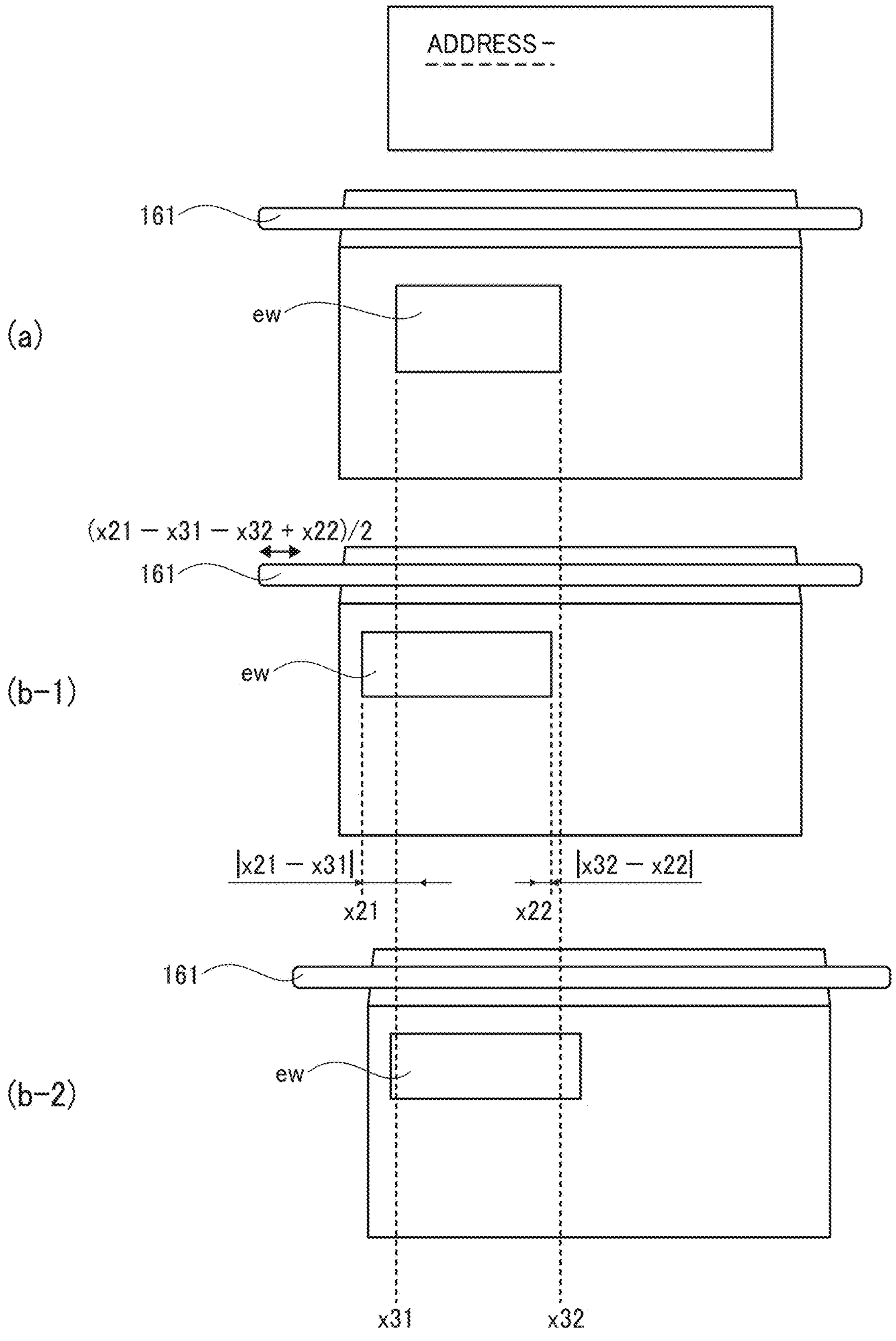
FIG. 22 is a diagram illustrating an outline of position adjustment processing and lateral shift processing according to an embodiment of the present disclosure.

FIG. 22 represents an example in which the position of specific information (address) formed on an enclosure (folded sheet Sf) is adjusted so that the specific information falls within the transparent window ew of a standard envelope E without using the position of the specific information. When the position information of the specific information (address) cannot be acquired from the upstream apparatus (e.g., the printer controller 260), on the assumption that the position of the specific information (address) is formed so as to match the position of the transparent window ew in the standard envelope E. processing is performed as a precondition that the specific information (address) has been printed so as to match the position of the transparent window ew of the standard envelope E defined in advance.

In this case, the coordinates of ends of the specific information in the width direction are referred to as x31 and x32. Then, the amount of deviation between the standard address window and the address window can be calculated by the expressions of x21−x31 and x32−x22 for the respective ends. The movement amount by which the amount of displacement of the flap holding roller pair 161 is uniform in both end portions of the envelope E can be calculated by an expression of (x21−x31−x32+x22)/2. Shifting the envelope E in the width direction on the basis of the calculated values allows the amounts of displacement in the width direction to be adjusted to be uniform.

Further, since the width dimension (envelope width) of the envelope E can be detected by the envelope sensor 185, the shift amount by which the folded sheet Sf can be inserted can be determined. In a case where the shift amount needed for the adjustment exceeds the shift amount by which the folded sheet Sf can be inserted, it can be also determined to be an error.

A description is given below of the determination of enclosing failure.

As illustrated in FIGS. 12 and 13, when an enclosure (folded sheet Sf) is enclosed into the envelope E and the envelope E is conveyed to the envelope ejection tray 134, the envelope E passes the envelope sensor 185 again. In the following description, an envelope image acquired by the envelope sensor 185 when the envelope E is conveyed from the envelope load tray 127 to the envelope ejection tray 134 is referred to as a first image. An envelope image acquired by the envelope sensor 185 when the envelope E having been subjected to the enclosing process is conveyed from the enclosing position to the envelope ejection tray 134 is referred to as a second image.

The envelope processing controller 150 determines the difference between the first image and the second image, and can thus determine the presence or absence of the specific information in the transparent window ew. No specific information visible in the transparent window ew indicates that the enclosure has not been enclosed into the envelope. Thus, a failure of the enclosing process can be detected.

A description is given below of the determination of the enclosed state.

The flap detection sensor 186 included in the enclosing support 160 is a sensor that determines, based on the presence or absence of a shielding object, that a flap ef of an envelope E is held by the flap holding roller pair 161 when the envelope E has been conveyed to the enclosing position. In other words, the flap detection sensor 186 is a sensor to detect that the flap ef is at a predetermined position. In the present embodiment, the predetermined position refers to a position at which the flap ef does not interfere with the insertion (intrusion) of the enclosure into the opening of the envelope E during enclosing.

After the enclosure (folded sheet Sf) is inserted into the envelope E by the pushing plate 163, the envelope E is conveyed in the ejection direction. In this step, when the envelope E is appropriately conveyed in the ejection direction, the flap ef moves away from the flap holding roller pair 161 and there is no obstacle for the flap detection sensor 186. In this case, it can be determined that the conveyance and the enclosing are appropriately performed. By contrast, in a case where the enclosing of the enclosure by the pushing plate 163 fails and the enclosure still remains, the shielding object (i.e., the enclosure) for the flap detection sensor 186 remains present. In this case, it can be determined that there is an enclosing failure.

The conveyance sensor 187 is a sensor that detects the presence or absence of an object to be conveyed (envelope E). The enclosure (the folded sheet Sf) is enclosed into the envelope E by the pushing plate 163, and the envelope E is conveyed in the ejection direction. When the conveyance is appropriately performed, the shielding object for the conveyance sensor 187 is not present and the state of the conveyance sensor 187 changes. Thus, it can be determined that the conveyance has been appropriately performed.

By contrast, if the enclosing of the enclosure (the folded sheet Sf) by the pushing plate 163 has failed, the enclosure overlaps with the envelope E, and only one of the envelope E and the folded sheet Sf is conveyed, the shielding object (the envelope E or the folded sheet Sf) for the conveyance sensor 187 remains present. In this case, the state of the conveyance sensor 187 does not change, and thus it can be determined that the conveyance has not been appropriately performed.

A description is given below of a procedure of an enclosing control process.

Figure 23:
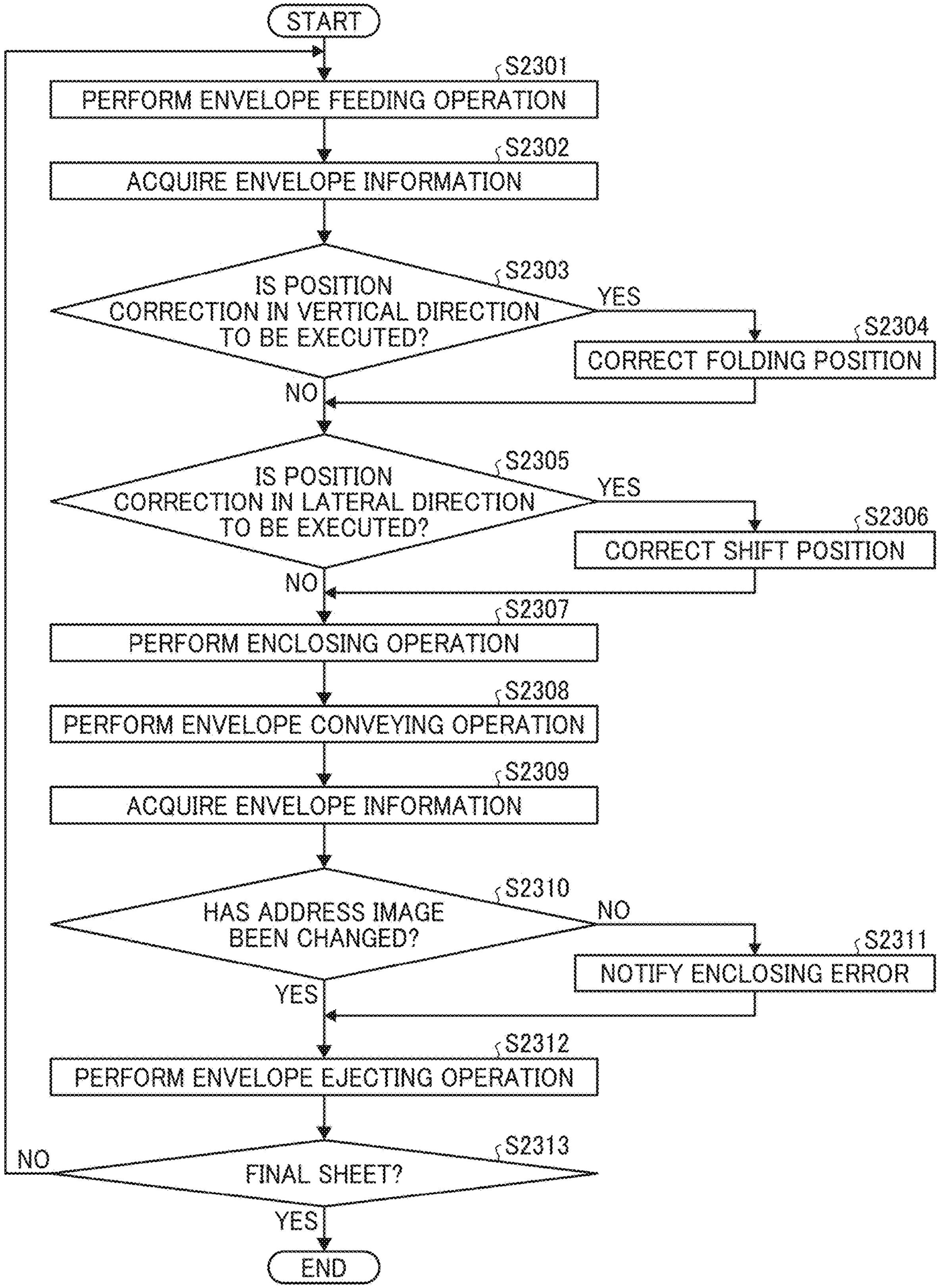
FIG. 23 is a flowchart of an enclosing-and-sealing process according to an embodiment of the present disclosure.

Specifically, an enclosing control process according to an embodiment of the present disclosure is described with reference to the flowchart of FIG. 23. The process described below relates to a control process performed in the image forming system 1. The processes described below may include processes that may be executed in parallel as appropriate in a case where there occurs no conflict even if the processes are executed in parallel.

The printer controller 260 of the image forming apparatus 200 notifies the envelope processing controller 150 of the start of an enclosing job, and thus the enclosing process in the envelope processing apparatus 100 is started. First, the process for conveying the envelope E to the enclosing position is executed (step S2301).

Since the envelope E passes the envelope sensor 185 in the course of being conveyed to the enclosing position, the envelope sensor 185 acquires an image of the envelope E (first image as an envelope image) and notifies the envelope processing controller 150 of the image. The envelope processing controller 150 analyzes the envelope image notified from the envelope sensor 185, and acquires envelope information related to the position of the transparent window ew (step S2302).

Subsequently, the envelope processing controller 150 determines whether the position adjustment of the folded sheet Sf in the conveyance direction is to be performed (step S2303), based on the acquired envelope information, for example, as described with reference to FIGS. 19C and 19D, based on the specific information (address) and the position information of the transparent window ew. When it is determined that the position adjustment in the conveyance direction is to be performed (YES in step S2303), the envelope processing controller 150 generates position adjustment information for adjusting the folding position, and notifies the folding controller 320 of the position adjustment information. Thus, a folding-position correction process of correcting the folding position in the vertical direction is executed (step S2304).

When it is determined that the position adjustment in the conveyance direction is not to be performed (NO in step S2303) or after the folding position correction process is executed, as described with reference to FIGS. 19A and 19B, the envelope processing controller 150 determines whether the position adjustment of the folded sheet Sf in the width direction is to be performed, based on the specific information (address) and the position information of the transparent window ew (step S2305).

When it is determined that the position adjustment in the width direction is to be performed (YES in step S2305), the envelope processing controller 150 moves the flap holding roller pair 161 in the lateral direction to shift the position of the envelope E (step S2306). When the position adjustment of the envelope E in the lateral direction is performed, it is assumed that the conveyance of the envelope E to the enclosing position has been completed. When the conveyance is not completed, the process is waited.

When it is determined that the position adjustment in the width direction is not to be performed (NO in step S2305) or after the folding position correction process has been executed, the envelope processing controller 150 executes the enclosing operation using the enclosing support 160 (step S2307).

Subsequently, after an enclosure is enclosed into the envelope E, the envelope E is conveyed to the envelope ejection tray 134 (step S2308).

Since the envelope E passes the envelope sensor 185 in the course of being conveyed to the envelope ejection tray 134, the envelope sensor 185 acquires an image of the envelope E (second image as an envelope image) and notifies the envelope processing controller 150 of the image. The envelope processing controller 150 analyzes the second image notified from the envelope sensor 185, calculates a difference between the first image and the second image, and detects the presence or absence of the specific information at the position of the transparent window ew (step S2309).

Subsequently, when no specific image is detected in the portion of the transparent window ew (NO in step S2310), the envelope processing controller 150 determines that an enclosing error has occurred and notifies the user of the enclosing error via the notification device 190 (step S2311).

When a specific image is detected in the portion of the transparent window ew (YES in step S2310), the envelope processing controller 150 determines that the enclosing process has been appropriately performed, performs the sealing process, and ejects the envelope E to the envelope ejection tray 134 (step S2312).

Subsequently, the envelope processing controller 150 determines whether the process of enclosing in the folded sheet Sf included in the enclosing job has been all completed (step S2313). When the sealing process has not been completed (NO in step S2313), the process is returned to step S2301. If the sealing process has been completed (YES in step S2313), the envelope processing controller 150 ends the enclosing job.

In the case of an enclosing job for executing a plurality of enclosing processes, if envelope information (first image) is acquired for each envelope E, enclosing enclosures into various types of envelopes E can be performed.

A description is given of a specific position set by a user according to some embodiments of the present disclosure.

Specifically, a description is given below of an example in which an image of an envelope E is displayed on the operation device 220 and a user adjusts the position of the envelope E relative to the specific information.

Figure 24:
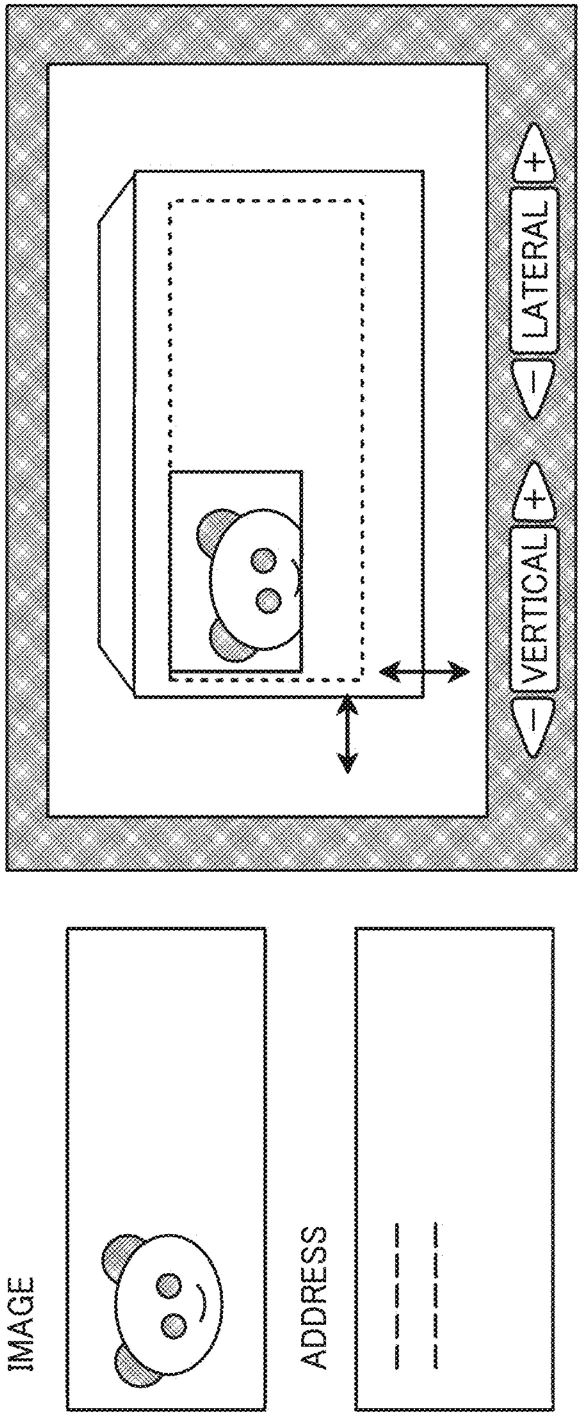
FIG. 24 is a diagram illustrating a position adjustment setting interface according to an embodiment of the present disclosure.

FIG. 24 represents an example of an envelope image and an image of an enclosure displayed on the operation device 220 of the image forming apparatus 200. In the present embodiment, for example, the envelope E is once read by the envelope sensor 185, the captured envelope image is communicated to the image forming apparatus 200, and the image forming apparatus 200 that has acquired the enclosed image displays the envelope image on the operation device 220. The specific information is generated by analyzing document data or other data used for the image forming processing and is displayed on the operation device 220.

Since the relative positional relationships between the envelope image and the image of the specific information in the vertical and lateral directions change by operating "+" and "−" with respect to the operation buttons of "vertical" and "lateral" displayed on the operation device 220, the user can adjust the operation while visually recognizing the relative position on the basis of the display of the operation device 220.

When the user stops the operation when a suitable state is obtained, the suitable state is reflected on the position control of the envelope E in the enclosing operation afterwards.

For the information indicating the relative positions of the envelope E and the enclosure (folded sheet Sf) adjusted by the procedure described above, an adjustment amount is calculated by the printer controller 260 based on the operation amounts of "+" and "−" with respect to the "vertical" and "lateral" operation buttons displayed on the operation device 220, and is notified to the folding controller 320 and the envelope processing controller 150. Based on the notified adjustment amount, the adjustment of the folding position and the shift in the width direction are executed.

In addition to the specific information as an address, for example, an adjustment can be performed such that information that is hard to determine is arranged at a desired position of the user.

According to the related art, the relative positions of a window-shaped portion and specific information are adjusted in the conveying direction of the envelope, but are not adjusted in the width direction of the envelope. In other words, the displacement in the width direction between the specific information formed on the enclosure and the envelope is not adjusted.

As described above, the image forming system 1 according to the present embodiment relates to a technology of receiving a sheet on which an image has been formed and on which a folding process such as three folding has been performed and automatically performing an enclosing-and-sealing process on an envelope. In the technology, the image forming system 1 can adjust the displacement between an address and an enclosure in the width direction of the envelope. This adjustment can be performed by the shift operation of the envelope E when the flap ef is fixed. Such a configuration can obviate the need to stop the enclosing process for the position adjustment, and thus correct the displacement of the envelope in the width direction of the envelope without decreasing the productivity of the enclosing process.

Aspects of the present disclosure are, for example, as follows.

First Aspect

An envelope processing apparatus conveys an envelope to an enclosing position and encloses an enclosure on which specific information is formed at a formation position. The envelope processing apparatus includes: an envelope conveyor to convey the enclosure to the enclosing position at which the enclosure is inserted into the envelope and eject the envelope in which the enclosure is enclosed; an envelope-information acquisition unit to acquire, as an image, a structure of the envelope during conveyance of the envelope, and acquire at least transparent-portion information that is information indicating a position of a transparent portion included in the structure of the envelope; an envelope holder to hold the envelope, which has reached the enclosing position, in a state in which the enclosure is insertable into the envelope; and a controller to output position adjustment information for adjusting a position of the envelope in a width direction of the envelope at the enclosing position or a position, in a conveyance direction of the envelope, of the formation position of the specific information, based on relative positions between the formation position of the specific information and the position of the transparent portion.

Second Aspect

In the envelope processing apparatus according to the first aspect, the controller adjusts the position of the envelope in the width direction at the enclosing position such that the formation position of the specific information matches the position of the transparent portion.

Third Aspect

In the envelope processing apparatus according to the first or second aspect, the controller outputs the position adjustment information, as control information related to a folding process to be executed before the enclosure reaches the enclosing position, in order to adjust the position of the formation position of the specific information in the conveyance direction of the envelope.

Fourth Aspect

In the envelope processing apparatus according to any one of the first to third aspects, the controller determines whether the enclosure is appropriately inserted, based on a comparison of a first image acquired when the envelope is conveyed to the enclosing position and a second image acquired when the envelope with the enclosure inserted in the envelope is conveyed from the enclosing position to an ejection position.

Fifth Aspect

In the envelope processing apparatus according to any one of the first to fourth aspects, the controller determines a conveyance posture of the envelope based on the image, and performs one of adjustment of the position of the envelope in the width direction and output of the position adjustment information, based on the conveyance posture.

Sixth Aspect

The envelope processing apparatus according to any one of the first to fifth aspects includes an enclosing device to insert an enclosure into an envelope and a sealing device to seal the envelope in which the enclosure has been inserted. The enclosing device is the enclosing device according to any one of the first to seventh aspects.

Seventh Aspect

An image forming system includes an image forming apparatus and the envelope processing device according to any one of the first to sixth aspects. The image forming apparatus forms an image on the enclosure and includes a position specifier to specify a position of the transparent portion relative to the formation position of the specific information, based on an operation by a user. The controller outputs the position adjustment information for adjusting the position of the envelope in the width direction at the enclosing position or the formation position of the specific information in the conveyance direction, based on the position of the transparent portion specified by the position specifier and the relative positions between the formation position of the specific information and the position of the transparent portion.

Eighth Aspect

An image forming system includes the envelope processing apparatus according to any one of the first to sixth aspects and an image forming apparatus. The image forming apparatus includes a folding processing device to perform a folding process on the enclosure of a sheet shape. The folding processing device adjusts a folding position of the enclosure based on the position adjustment information.

Ninth Aspect

An image forming system includes: an image forming apparatus to form an image on a sheet medium; and the envelope processing apparatus according to any one of the first to sixth aspects to insert the sheet medium as the enclosure, on which the image has been formed, into the envelope.

Embodiments of the present disclosure are not limited to the above-described embodiments, and numerous additional modifications and variations are possible in light of the teachings within the technical scope of the present disclosure. It is therefore to be understood that the above-described embodiments of the present disclosure may be practiced otherwise by those skilled in the art than as specifically described herein. Such embodiments and variations thereof are included in the scope and gist of the embodiments of the present disclosure and are included in the embodiments described in claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An envelope processing apparatus to convey an envelope to an enclosing position and enclose an enclosure on which specific information is formed at a formation position, the envelope processing apparatus comprising:

an envelope conveyor to convey the enclosure to the enclosing position to insert the enclosure into the envelope and eject the envelope in which the enclosure has been inserted;

a sensor to acquire, as an image, a structure of the envelope during conveyance of the envelope, and acquire at least transparent-portion information indicating a position of a transparent portion included in the structure of the envelope;

an envelope holder to hold the envelope, which has reached the enclosing position, in a state in which the enclosure is insertable into the envelope; and control circuitry configured to output position adjustment information for adjusting a position of the envelope in a width direction of the envelope at the enclosing position or a position of the specific information in a conveyance direction of the envelope, based on relative positions between the formation position of the specific information and the position of the transparent portion.

2. The envelope processing apparatus according to claim 1, wherein the control circuitry is configured to adjust the position of the envelope in the width direction at the enclosing position such that the formation position of the specific information matches the position of the transparent portion.

3. The envelope processing apparatus according to claim 1, wherein the control circuitry is configured to output the position adjustment information, as control information related to a folding process to be executed before the enclosure reaches the enclosing position, in order to adjust the position of the specific information in the conveyance direction of the envelope.

4. The envelope processing apparatus according to claim 1, wherein the control circuitry is configured to determine whether the enclosure is appropriately inserted, based on a comparison of a first image acquired when the envelope is conveyed to the enclosing position and a second image acquired when the envelope in which the enclosure has been inserted is conveyed from the enclosing position to an ejection position.

5. The envelope processing apparatus according to claim 1, wherein the control circuitry is configured to determine a conveyance posture of the envelope based on the image and perform one of adjustment of the position of the envelope in the width direction and output of the position adjustment information, based on the conveyance posture.

6. The envelope processing apparatus according to claim 1, further comprising:

an enclosing device to insert the enclosure into the envelope; and a sealing device to seal the envelope in which the enclosure has been inserted.

7. An image forming system, comprising:

an image forming apparatus to form an image on the enclosure, the image forming apparatus including an operation interface to specify a position of the transparent portion relative to the formation position of the specific information, based on an operation by a user; and the envelope processing apparatus according to claim 1, wherein the control circuitry is configured to output the position adjustment information for adjusting the position of the envelope in the width direction at the enclosing position or the position of the specific information in the conveyance direction of the envelope, based on the position of the transparent portion specified by the operation interface and the relative positions between the formation position of the specific information and the position of the transparent portion.

8. An image forming system, comprising:

the envelope processing apparatus according to claim 1; and an image forming apparatus including a folding processing device to fold the enclosure of a sheet shape and adjust a folding position of the enclosure based on the position adjustment information.

9. An image forming system, comprising:

an image forming apparatus to form an image on a sheet medium; and the envelope processing apparatus according to claim 1 to insert the sheet medium as the enclosure, on which the image has been formed, into the envelope.

* * * * *